United States Patent
Kohzuki et al.

(10) Patent No.: US 6,512,741 B1
(45) Date of Patent: Jan. 28, 2003

(54) COMMUNICATION DEVICE WITH MULTI-STAGES OF TRAFFIC SHAPING FUNCTIONS

(75) Inventors: Kiyoshi Kohzuki, Ebina (JP); Takeshi Aimoto, Sagamihara (JP); Takeki Yazaki, Kokubunji (JP); Noriyuki Tanaka, Ebina (JP); Yoshinori Yamamura, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/350,140

(22) Filed: Jul. 9, 1999

(30) Foreign Application Priority Data

Jul. 9, 1998 (JP) .......................................... 10-193960

(51) Int. Cl.[7] .......................... H04L 1/00; H04L 12/26
(52) U.S. Cl. ................................... 370/230.1; 370/235
(58) Field of Search .............................. 370/229, 230, 370/230.1, 235, 395, 395.1, 395.2, 395.21, 395.4, 395.41, 395.42, 395.43, 412, 428

(56) References Cited

U.S. PATENT DOCUMENTS

| | | | | |
|---|---|---|---|---|
| 5,793,747 A | * | 8/1998 | Kline | 370/230 |
| 5,864,540 A | * | 1/1999 | Bonomi | 370/235 |
| 5,940,397 A | * | 8/1999 | Gritton | 370/412 |
| 5,982,749 A | * | 11/1999 | Daniel | 370/233 |
| 6,011,775 A | * | 1/2000 | Bonomi | 370/230 |
| 6,091,708 A | * | 7/2000 | Matsunuma | 370/233 |
| 6,359,889 B1 | * | 3/2002 | Tazaki | 370/395 |

FOREIGN PATENT DOCUMENTS

| | | |
|---|---|---|
| JP | 6315034 | 11/1994 |
| JP | 9307566 | 11/1997 |

OTHER PUBLICATIONS

"Traffic Management Specification Version 4.0", The ATM Forum Technical Committee TM 4.0, pp., Apr. 1996.

* cited by examiner

Primary Examiner—Ajit Patel
Assistant Examiner—Chirag Shah
(74) Attorney, Agent, or Firm—Antonelli, Terry, Stout & Kraus, LLP

(57) ABSTRACT

A traffic shaper which includes a cell buffer for temporarily storing an ATM cell arrived thereat, a first calculator for calculating an estimated cell sending time according to a VC contracted bandwidth, a second calculator for calculating an estimated cell sending time according to a VP contracted bandwidth, a binary tree VP sorting circuit for determining VP to be sent in top priority, a binary tree VC sorting circuit for determining VC to be sent in top priority, and a sending circuit for sending a cell in which the determined VP and VC are both brought to a transmittable state. The VP estimated sending time is revised according to the VC estimated sending time.

16 Claims, 15 Drawing Sheets

( EST : Estimated Sending Time )

Each element means

| VC Identifer |
| Estimated Sending Time |
| (VLD) |

Each element means

| VC Identifer |
| Estimated Sending Time |
| (VLD) |

FIG.17
(1) Few bytes are sent when the shaper sent short packets continuously.
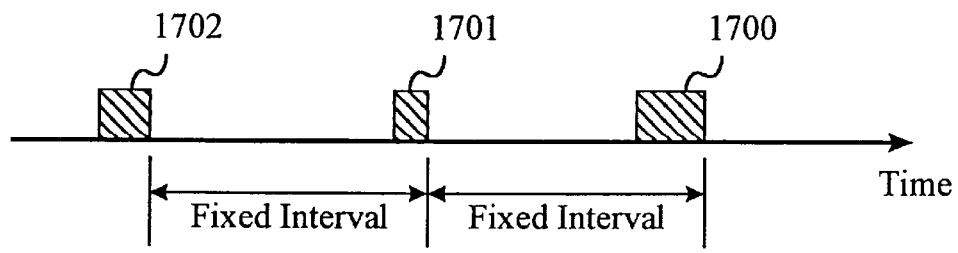
(2) Many bytes are sent when the shaper sent long packets continuously.
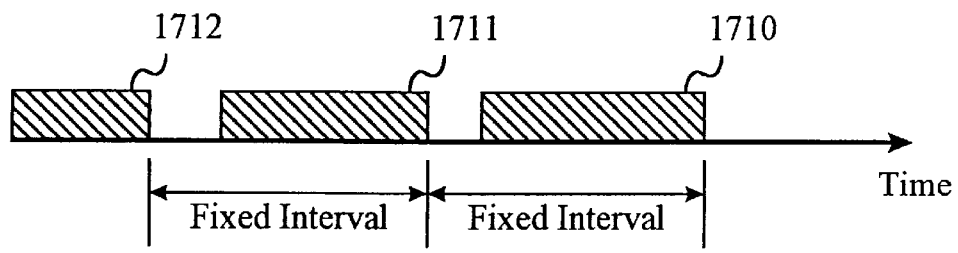
FIG.18
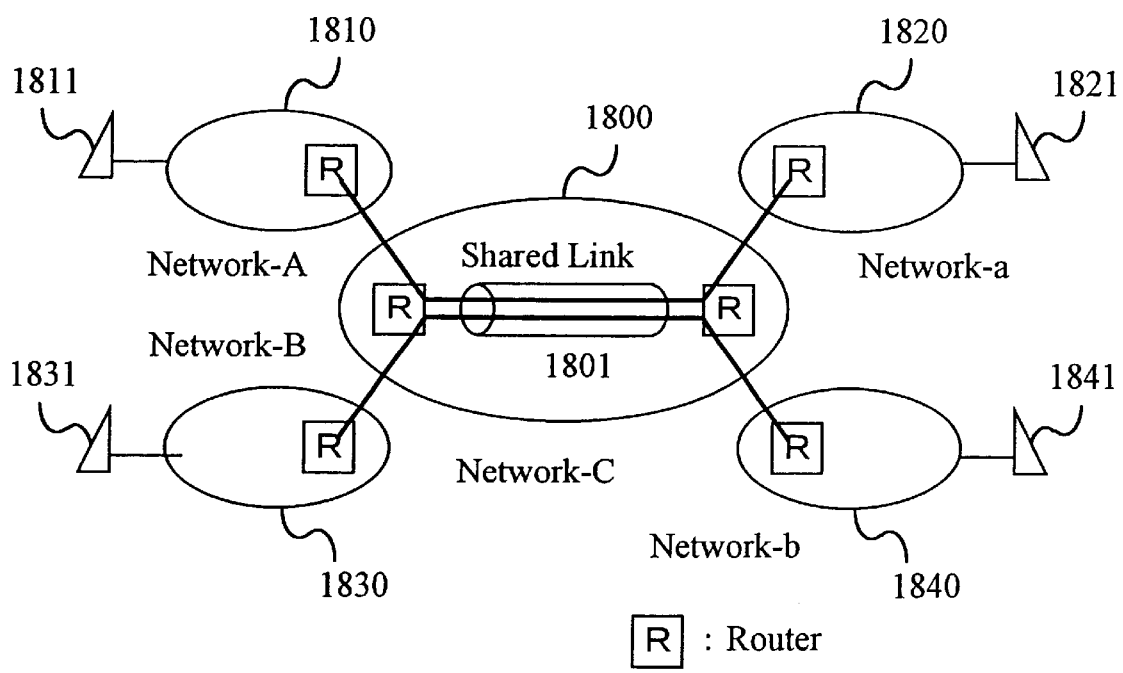

COMMUNICATION DEVICE WITH MULTI-STAGES OF TRAFFIC SHAPING FUNCTIONS

BACKGROUND OF THE INVENTION

1. Field of the Invention

The present invention relates to a communication device having a traffic shaping function, and more specifically to an ATM terminal and an ATM switching system each having a traffic shaping function for a fixed length packet, and a communication device having a traffic shaping function for a variable length packet.

2. Description of the Related Art

An asynchronous transfer mode (ATM) technique for efficiently supporting various communication traffics such as voice, images, and data by using fixed length packets each called cell is widely known as a communication technology suitable for multimedia communications.

In the ATM, a user makes a contract about a transmission bandwidth with a network before cell transmission in units called VC (Virtual Connection) in advance. The contents of the contract differs according to the type of information to be transferred through each VC referred to above. In a real-time traffic for communications of an audio signal and a picture signal that demands for a low delay transfer, for example, a constant bandwidth is ensured within a line in advance and each cell is sent within the ensured bandwidth.

In "The ATM Forum TM4.0" (prior art 1), a CBR (Constant Bit Rate) service category in which cells are sent within a fixed bandwidth ensured in advance according to a contract, and a VBR (Variable Bit Rate) service category in which the maximum transmission bandwidth and the average transmission bandwidth are placed under contract and cells are sent in a transmission bandwidth which varies according to the elapse of time, are shown as service classes for transferring real-time traffic data for speech and pictorial communications.

On the other hand, a computer-to-computer data communication has a problem in that when a bandwidth necessary for data transmission is ensured within a line in advance, the preserved bandwidth is occupied needlessly during a data transmission-free period because a traffic occurs on a burst basis (unexpectedly) and is terminated. The bandwidth held by the transmission line cannot be utilized effectively. In general, a burst traffic for non-real time communications does not attach much importance to the transmission delay important for communications by voice or the like. Thus, in the burst traffic communication, the transmission of each data cell is started without ensuring a required bandwidth in advance and the cells are temporarily stored at a node on which large amounts of data cells are focused. The bandwidth for the transmission line is effectively utilized. At each node, a cell for the real-time traffic is outputted in preference to a cell for the burst traffic. When the amount or rate of cells stored at the node exceeds the buffer capacity of the node, some of data cells belonging to the subsequent-incoming burst traffic are discarded.

In the prior art 1, an ABR (Available Bit Rate) service category for feeding back a congested (busy) state in a network to a cell sending terminal to thereby prevent the discarding of cells and a UBR (Unspecified Bit Rate) service category for allowing a sending terminal to continuously transmit cells so long as an empty or vacant bandwidth exists in a line in order to effectively utilize a line bandwidth are given as service classes for transferring the burst traffic cells. VC multiplexed over an ATM transmission line falls into or belongs to any of the service classes of said four categories.

From the characteristics about the delay/discarding of the respective service classes, each cell, which belongs to VC placed under the CBR service, is transferred most preferentially when traffics of a plurality of VC compete with one another at a node in the network. Priority control on the cell transfer is performed in the order of the CBR, VBR, ABR and UBR services.

A terminal (user), which takes advantage of the respective CBR, VBR and ABR services, makes a contract with a network, which is related to a transmission bandwidth such as the maximum transmission bandwidth, prior to its communication on the network. In the communication of the UBR service class, there are two cases: one in which a user makes a contract related to the transmission bandwidth (e.g., the maximum transmission bandwidth) and another in which no contract is done. In a public ATM network, a flow rate of cells transmitted from a terminal is monitored at an entrance of the network so as to detect VC which violates a contracted bandwidth. A marking indicative of each cell to be discarded upon the occurrence of congestion, for example, is effected on each cell which belongs to the violated VC. Such monitoring of each cell placed under violation of the contract is called UPC (Usage Parameter Control).

When a cell is discarded in the course of a transmission line, it is normally recognized by the receiving terminal that the cell has been discarded. Since, in this case, the receiving terminal requests each of transmitting terminals to re-send the discarded information and hence the transmitting terminal re-sends the information, the finally failure-free information can be sent to the corresponding receiving terminal. However, the discarding of cells in the ATM network could lead to a great delay in the transmission of the information and the occurrence of the secondary additional congestion by the re-sent cells. Thus, it is important that each transmitting terminal controls the transmission of cells at a cell flow rate set according to each contracted bandwidth so that the cells are not determined as the violated cells by the UPC function held by the network. Such a cell flow-rate control function is called traffic shaping. Incidentally, the traffic shaping is necessary even for respective switching nodes or switching systems located at important points in the ATM network to accommodate or absorb fluctuations of a cell interval for each VC, which occur in the network.

As a communication device or apparatus provided with the aforementioned traffic shaping function, there is known, for example, "Cell flow controller and ATM communication network" described in Japanese Unexamined Patent Publication No. Hei 6-315034 (prior art 2). When a relay node in an ATM network sends out each received cell entering with a bandwidth exceeding a contracted value to an output line with the same bandwidth as upon its reception, the cells are excessively sent out to the output line, thus causing a possibility that the cells will be discarded due to the UPC function at other nodes on a transmission route or line. Therefore, the prior art 2 has proposed that a memory for temporarily storing cells is provided in the cell flow controller and the cells received over the contracted bandwidth are temporarily stored in the memory and read out in accordance with the contracted bandwidth. However, while the prior art 2 has been described about a cell sending-interval control function using a buffer memory, which is necessary at the minimum to perform traffic shaping, it does not disclose such information as a specific device configuration, the required capacity of memory, and a process time, which is necessary for implementing the invention.

As another known technique related to the traffic shaping, there is known "Traffic shaping device" described in Japanese Unexamined Patent Publication No. Hei 9-307566 (prior art 3). In the prior art 3, the estimated sending time of the next cell is managed by a binary tree structure for each VC, and VC for which cells are transmitted in top priority is selected in a short processing time of the order of log2 [number of VC] by special sorting using the result of previous sorting. According to the prior art 3, the time required to select a cell to be next transmitted can be greatly shortened using a memory having reduced capacity.

As bandwidth contracts for taking advantage of a public ATM network, there are known a contract made in VC units and a contract made in units of VP (Virtual Path) comprised of bundles of a plurality of VC. The bandwidth contract given in the VP units is normally made for each positions of the partners to communicate therewith. When a terminal 300 communicates with terminals 1901, 1902 and 1903 through a public ATM network 340 as shown in FIG. 19 by way of example, bandwidth contracts are made for each VP for connecting the terminal 300 to the partner terminals. Namely, for example, a contract related to a bandwidth of 90 Mbps, a contract related to a bandwidth of 30 Mbps and a contract related to a bandwidth of 30 Mbps are respectively made to VP(0)210 lying between the terminal 300 and the terminal 1901, VP(1)220 lying between the terminal 300 and the terminal 1902, and VP(2)230 lying between the terminal 300 and the terminal 1903. These VP(0) through VP(2) are tied up in a bundle on a line of 150 Mbps connecting between the terminal 300 and an ATM switch 341.

FIG. 2 is a conceptional diagram showing the relationship between a line 200 lying between the terminal 300 and the ATM switch 341 shown in FIG. 19 and VP and VC multiplexed over the line.

In FIG. 2, three VC211, 212 and 213 are tied up in a bundle within VP(0) 210 of 90 Mbps, two VC 221 and 222 are tied up in a bundle within VP(1) 220 of 30 Mbps, and two VC 231 and 232 are tied up in a bundle within VP(2) 230 of 30 Mbps, respectively.

As to the contracts carried out in the VP units, the network management side monitors only whether each traffic keeps the contract bandwidth set for each VP. Namely, in FIG. 19, the UPC function of the ATM switch 341 located at the entrance of the public ATM network 340 monitors a contract violation in each VP unit over the line 200 and takes measures such as marking, cell discarding, etc. against each violated cell, but does not monitor each individual bandwidths in VC units bundled within each of said VPs.

When the violated cell is discarded owing to the action of the UPC function, the large delay occurs in the transfer of the information and the additional congestion occurs due to the re-sending of each cell as described above. It is therefore desirable that even each transmitting terminal is provided with a traffic shaping function (hereinafter called "VP shaping") for sending cells while keeping the contracted VP bandwidth.

When, for example, a traffic shaping device or shaper of the terminal 300 or ATM switch 341 sends each received cell to its corresponding output line while a reception sequence is being kept as it is although the bandwidth for each VC in VP is not monitored on the network side, the assurance of the bandwidth for the real-time traffic for the voice and pictorial communications and the low delay transfer cannot be implemented as the entire network. A traffic shaping function (hereinafter called "VC shaping") for effecting bandwidth control in VC units and priority control set according to the service classes on each individual VC bundled in one VP is required to transfer each cell at the real-time traffic with the low delay as in the case of the CBR and VBR services.

However, the prior art 2 and the prior art 3 have described the shaping function for either VP or VC and do not disclose, similar to the prior art 3, the traffic shaping technique which simultaneously perform shaping for both VP and VC.

SUMMARY OF THE INVENTION

A first object of the present invention is to provide a communication device, an ATM terminal or an ATM switching system having a traffic shaping function, which is capable of controlling contracted bandwidths for VP and bandwidths set every VC multiplexed within the VP and effectively using a bandwidth for a transmission line and each bandwidth for each VP over the transmission line.

A second object of the present invention is to provide a traffic shaping device or shaper, an ATM terminal or an ATM switching system capable of shaping traffics on a plurality of output lines by one device.

A third object of the present invention is to provide a communication device, an ATM terminal or an ATM switching system having a traffic shaping function for a packet sending terminal or packet switch, which is capable of controlling a bandwidth for each packet within a bandwidth contracted with a network for each variable length packet while keeping the contracted bandwidth to take advantage of the in-contracted bandwidth and a bandwidth for a line.

With a view toward simultaneously performing both traffic shaping for VP and VC, it is necessary to provide traffic shaping circuits for VP and VC and monitor whether both the traffic shaping circuits are in a cell transmission-allowed state, that is, both the circuits fall into an estimated sending time. The use of the system for managing each estimated sending time with the binary tree structure described in the prior art 3 allows the implementation of selecting VP to be sent most preferentially in all VP or of selecting VC to be sent in top priority in a plurality of VCs within the same VP. However, the situation that if the estimated sending times are independently calculated, then transmission-permitted VC does not exist within the VC even if VP is in a transmission-allowed state (falls into an estimated sending time), can happen. In this case, each cell can be transmitted by reducing the bandwidth for self VP or decreasing the bandwidth for the other VP. In either case, however, the bandwidth for a communication path or line and the bandwidth for contracted VP cannot be utilized effectively. It is thus necessary to consider the estimated sending time as for VP and the estimated sending time as for VC in cooperation with each other.

The provision of traffic shaping devices every line interfaces leads to an increase in the device cost when traffic shaping is effected on a large number of low-speed lines. Thus, if the traffic shaping can be effected on a plurality of output lines by one traffic shaping device, then the traffic shaping for the large number of lines can be carried out at low cost.

The problem is not specialized on the traffic shaping for ATM cells having the fixed length. Consider where a plurality of networks are connected to one another through the use of a shared line or link as in the case of an internet or the like, and the shared line is contracted every those networks. Networks given in such a configuration are shown in FIG. 18.

In FIG. 18, a network-A 1810 and a network-a 1820 are in possession of a provider A, and terminals 1811 and 1821 are defined as users for the provider A. Similarly, a network-B 1830 and a network-b 1840 are in possession of a provider B, and terminals 1831 and 1841 are defined as users for the provider B. Further, the networks-A, networks-a, networks-B and networks-b are respectively connected to a network C 1800 by routers. The providers A and B make contracts about sending bandwidths with the network C respectively, and shares the use of a shared line or link 1801 in the network C.

When the terminals 1811 and 1821 and the terminals 1831 and 1841 communicate with one another under such a network environment, it is desirable that while the bandwidth contracted in the shared line which corresponds to VP described in ATM is being kept, priorities are provided every packets transferred within the contracted bandwidth (e.g., a packet for TELNET takes precedence over a packet for an electronic mail) so that the bandwidth, which corresponds to VC described in ATM, can be managed. As the network forms, various operation forms are considered such as the sharing of a long-distance communication line by a plurality of enterprises or companies or the case where it is desired to manage traffics every departments and sections even in the same enterprise, etc. as well as the sharing of the line by providers. It is thus necessary to implement the network forms in form coping with them.

In order to achieve the above objects from the consideration, a communication device according to the present invention comprises a first estimated sending time calculation unit for calculating a first estimated cell sending time for sending a cell with a bandwidth contracted for each connection, a second estimated sending time calculation unit for calculating a second estimated cell sending time for sending a cell with bandwidth contracted for each connection bundle obtained by collecting a plurality of the connections, and means for selecting either the use of the second estimated cell sending time or the use of the first estimated cell sending time upon transmission of each cell. Since the first estimated cell sending time and the second estimated cell sending time can be used as needed, the contracted bandwidth can be kept.

In order to achieve the first through third objects from the above consideration, the present invention provides a traffic shaping device or shaper which performs shaping in multi-stage form.

Namely, in order to achieve the first object, the present invention provides a traffic shaper which is installed within a terminal or exchange switch connected to an ATM network. The traffic shaper comprises a cell buffer for temporarily storing each received cell therein, a first estimated sending time calculation unit for calculating a first estimated cell sending time at which a sending interval set according to a bandwidth contracted for each VC is kept, a first sorting unit for selecting VC earliest in the first estimated cell sending time calculated by the first estimated sending time calculation unit, a sending controller for determining whether the transmission of a cell which belongs to VC selected by the first sorting unit, is allowed, reading out the corresponding cell from the cell buffer when the transmission of the cell is allowed, and sending it therefrom, a second estimated sending time calculation unit for calculating a second estimated cell sending time at which a sending interval set according to a bandwidth contracted for each VP is kept, and a second sorting unit for selecting VP earliest in the second estimated cell sending time calculated by the second estimated sending time calculation unit. The sending controller has a function of determining whether each cell which belongs to VP selected by the second sorting unit, may be sent, determining, when the transmission of the cell is allowed, whether the cell belonging to the VC selected by the first sorting unit may be sent, reading out the corresponding cell from the cell buffer when the transmission of the cell is allowed, and sending it therefrom.

In order to perform priority control between a plurality of service classes in VP, in the traffic shaper of the present invention, the first sorting unit has a function of selecting VC earliest in the first estimated cell sending time from each group of VCs each having the same priority and lying within the respective VPs, and the sending controller has a function of determining whether each cell belonging to VP selected by the second sorting unit may be sent, and sending, when the transmission of the cell is allowed, a cell which is placed in a transmission-allowed state and belongs to VC given the highest priority, from VC selected every priorities by the first sorting unit.

Further, according to the present invention, a decision bit indicative of whether a transmission-wait cell exists within the cell buffer, is provided for each VC. A decision bit indicative of whether a transmission-wait cell exists within the cell buffer, is also provided for each VP.

Furthermore, the first sorting unit or circuit is provided with means for managing each first estimated cell sending time and the cell presence decision bits by a binary tree structure and selects VC to be transmitted in top priority using the past result of sorting. On the other hand, the second sorting unit or circuit is provided with means for managing each second estimated cell sending time and the cell presence decision bits by a binary tree structure and selects VP to be sent in top priority using the past result of sorting.

The second estimated sending time calculation unit may be provided with a time reviser circuit for using a first estimated cell sending time as a second estimated cell sending time when the first estimated cell sending time for each VC selected by the first sorting unit is in future ahead of the second estimated cell sending time calculated by the second estimated sending time calculation unit and the cell-presence decision bit for VC selected by the first sorting unit is set, whereby the estimated sending time for VP and the estimated sending time for VC can be matched with each other.

Further, when the priority control is being performed between the service classes in VP, the second estimated sending time calculation unit may be provided with a time reviser. The time reviser does not change the second estimated cell sending time when the cell-presence decision bits are not set to all VC selected every priorities by the first sorting unit, by using a first estimated cell sending time as a second estimated cell sending time, when the first estimated cell sending time for VC earliest in the first estimated cell sending time among VC selected every priorities by the first sorting unit and to which cell-presence decision bits are set, and is in future ahead of the second estimated cell sending time calculated by the second estimated sending time calculation unit. In this case, the second estimated sending time calculation unit is provided with a function of resetting a cell-presence decision bit to the corresponding VP, when the cell-presence decision bits are not set to all VC selected every priorities in the given VP by the first sorting unit, and setting a cell-presence decision bit to the corresponding VP, when the cell-presence decision bit is set to any of VC selected every priorities in given VP by the first sorting unit. It is thus possible to create the situation that a transmission-wait cell exists assuredly in VC lying within VP selected by the second sorting circuit.

Further, the process executed by the first sorting circuit and the process executed by the second sorting circuit can be also done in parallel to shorten the time required to perform the sorting process.

The second object can be achieved by providing the traffic shaper of the present invention as a trunk attached to the exchange switch and replacing the VP with a line (low-speed line).

In the present invention, for achieving the third object, a packet sending terminal or packet switching system is provided with a traffic shaper which comprises a packet buffer for temporarily storing each packet received in packet form therein, a first estimated sending time calculation unit for calculating a first estimated packet sending time at which a sending interval set according to a bandwidth determined for each packet priority is kept, a first sorting unit for selecting a packet priority earliest in the first estimated packet sending time calculated by the first estimated sending time calculation unit, a second estimated sending time calculation unit for calculating a second estimated packet sending time at which a sending interval set according to a bandwidth contracted for each packet transfer destination is kept, a second sorting unit for selecting a packet destination earliest in the second estimated packet sending time calculated by the second estimated sending time calculation unit, and a sending controller for determining whether a packet which belongs to each packet destination selected by the second sorting unit may be sent, determining, when the transmission of the packet is allowed, whether the packet belonging to the packet priority selected by the first sorting unit may be sent, reading out the corresponding packet from the packet buffer when the transmission of the packet is allowed, and sending it therefrom.

The traffic shaper may be provided with a function of extracting packet length information described in a header of a packet when the packet is read out from the packet buffer so that the first estimated sending time calculation unit calculates a first estimated packet sending time by using a sending interval proportional to the packet length information and the second estimated sending time calculation unit calculates a second estimated packet sending time by using the sending interval proportional to the packet length information.

Further, the traffic shaper intended for use in the packet sending terminal or packet switch may be configured in the same structure as that of the traffic shaper intended for use in the aforementioned ATM sending terminal or ATM exchange switch.

Typical ones of various inventions of the present inventions have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 17 is a diagram depicting the relationship between a packet length and a transmission interval;

FIG. 18 is a diagram showing a network configuration illustrated in an embodiment 4 of the present invention.

DETAILED DESCRIPTION OF THE PREFERRED EMBODIMENTS

A traffic shaper to which the present invention is applied, will hereinafter be described in detail as an embodiment 1 of the present invention. The embodiment shown below is an example of a traffic shaper or shaping device of a type wherein VP shaping and VC shaping are simultaneously performed by an ATM source end system, four service classes (CBR, VBR, ABR and UBR) are provided within a VP and control on priority between the service classes is performed.

Figure 3:
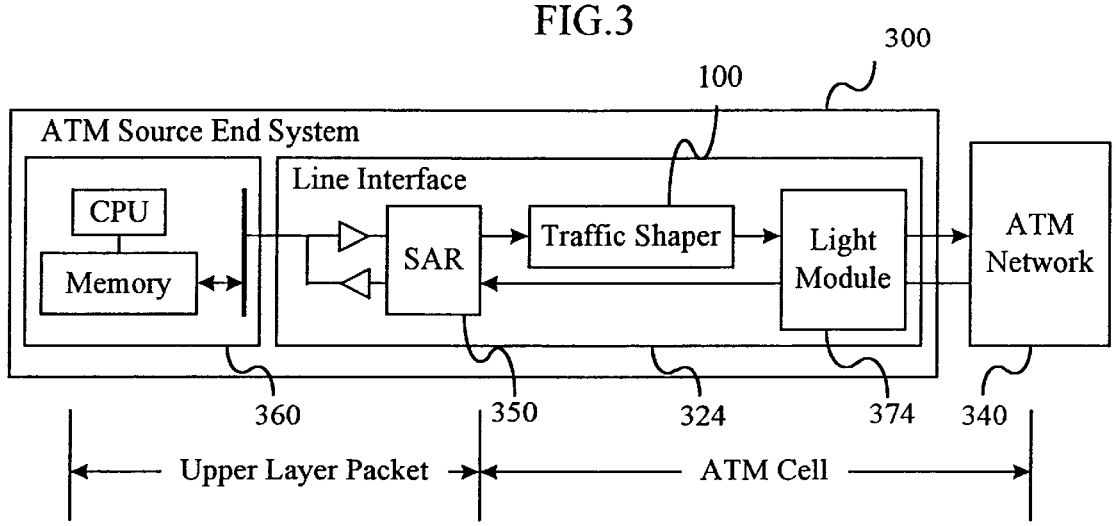
FIG. 3 is a diagram depicting a configuration of an ATM source end system to which the traffic shaper to which the present invention is applied, is applied as a VP shaping device.

FIG. 3 is a block diagram of an ATM source end system 300 electrically connected to a public ATM network 340. The ATM source end system 300 comprises a higher layer processing unit 360 comprised of a CPU and a memory, and a line interface 324 for the ATM network 340. In the higher layer processing unit 360, an upper protocol (e.g., IP :Internet Protocol) for transferring information through the use of the ATM network is operated so that a high-order or upper layer packet recognizable by the upper protocol is generated and terminated.

The line interface 324 is further provided with the following components. A SAR (Segmentation And Reassembly) 350 is a part which performs conversion (segmentation and reassembly) of an upper layer packet generated by the higher layer processing unit 360 to an ATM cell (53-byte fixed length). Thus, the present processing is effected in the form of the upper layer packet on the higher layer processing unit side as viewed from the SAR, whereas it is performed in the form of the ATM cell on the ATM network side as viewed from the SAR. The segmentation and reassembly include two cases: one in which its conversion is carried out by hardware and another in which it is performed by software. The traffic shaper 100 transmits ATM cells at band-observed transmission intervals contracted with the ATM network 340. The present invention principally relates to the traffic shaper 100. A light module 374 transforms the ATM cell to a signal corresponding to a physical line such as an optical fiber and transmits and receives it. Incidentally, the SAR is unnecessary when a variable length packet is used.

Figure 1:
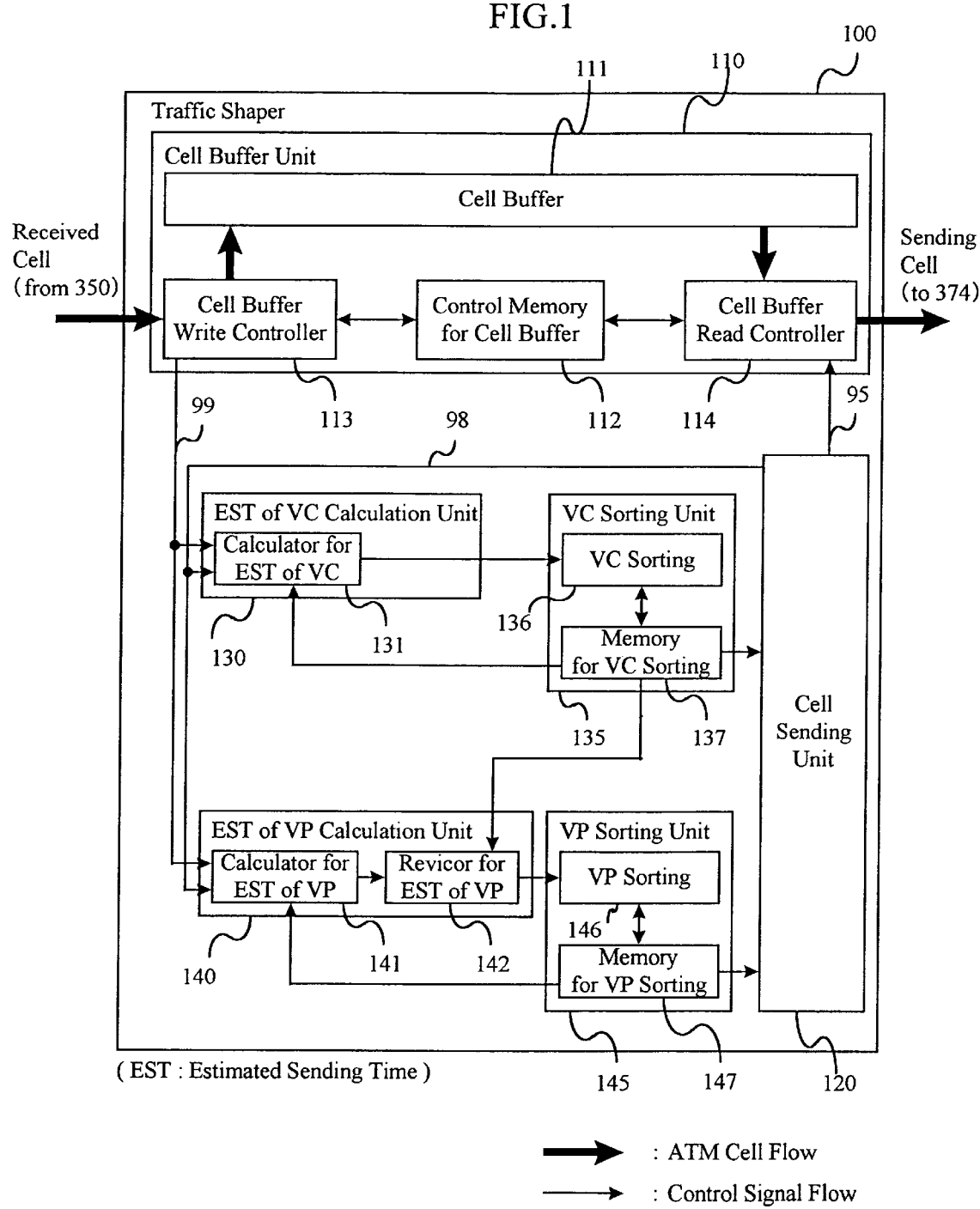
FIG. 1 is a block diagram showing a configuration of one embodiment of a traffic shaper to which the present invention is applied.
Figure 2:
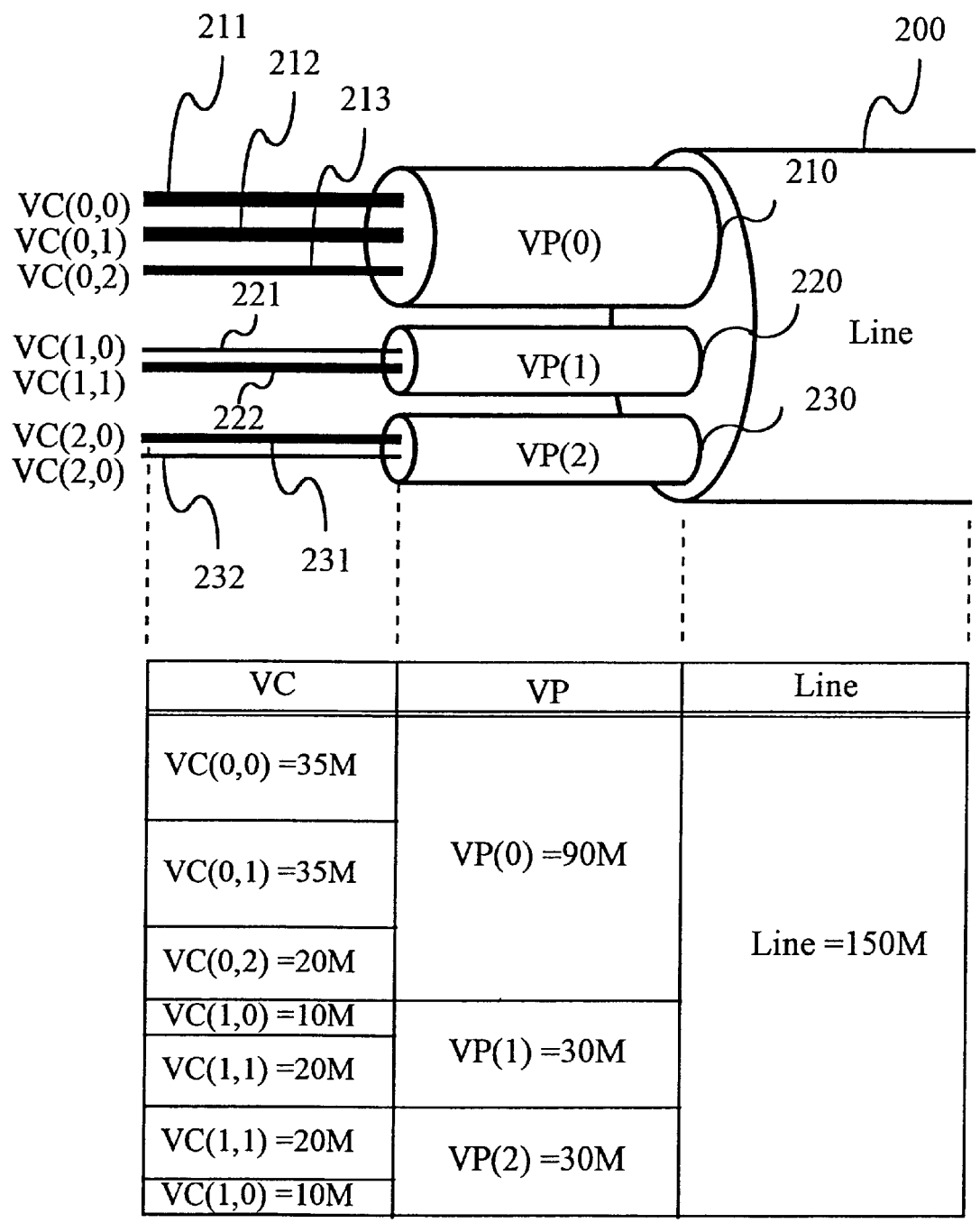
FIG. 2 is a diagram illustrating the concepts of a line, VP and VC.
Figure 4:
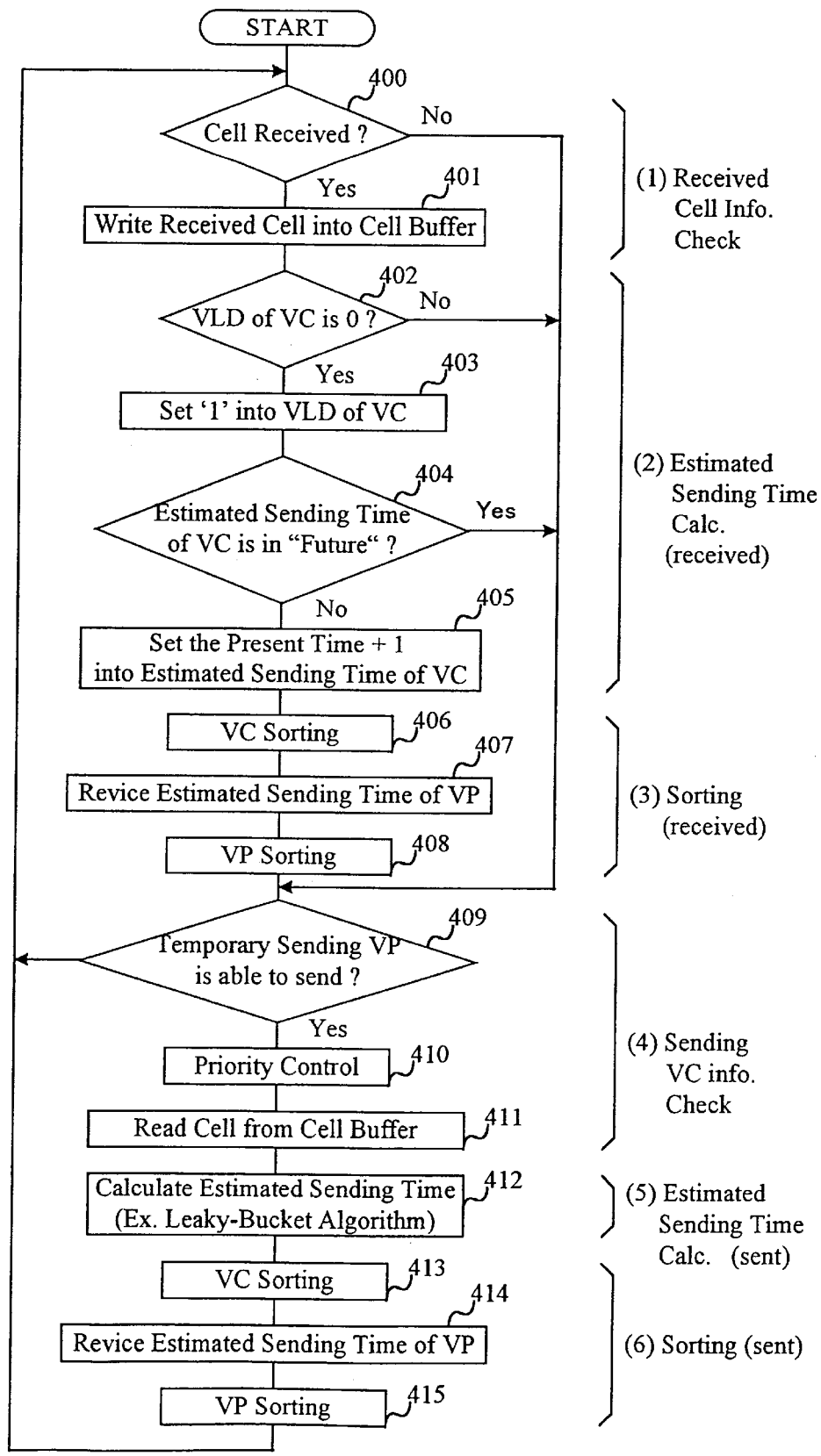
FIG. 4 is a flowchart for describing cell receive/transmit operations of the traffic shaper to which the present invention is applied.
Figure 5:
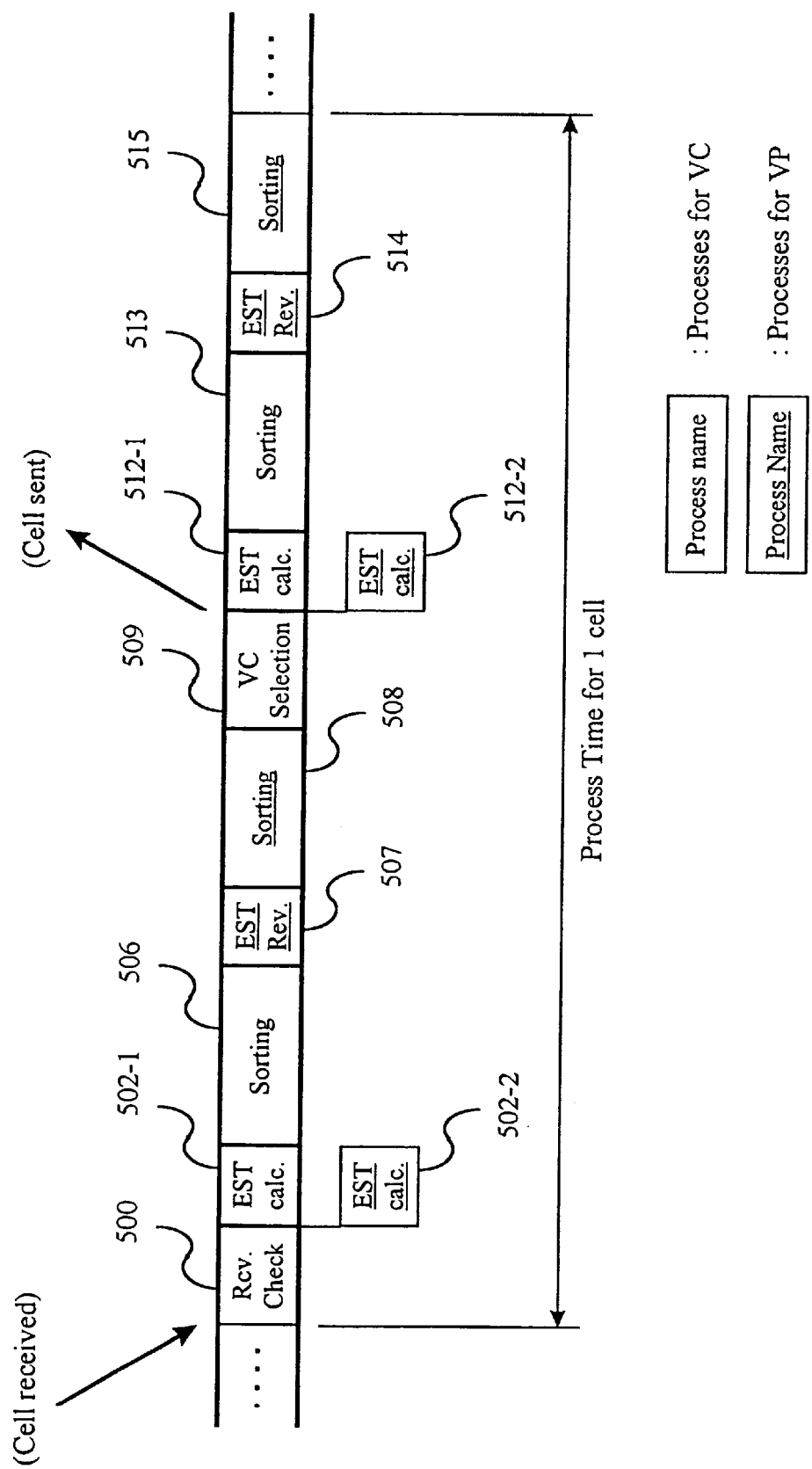
FIG. 5 is a timing chart of the traffic shaper to which the present invention is applied.

FIG. 1 is a block diagram showing a configuration of the traffic shaper 100. FIG. 4 is a flowchart for describing the operation of the traffic shaper 100. FIG. 5 is a timing chart therefor. The traffic shaper 100 to which the present invention is applied, is provided with components shown below.

The traffic shaper 100 comprises a cell buffer unit 110 for queuing cells into a queue for each VC, an estimated sending time (EST) of VC calculation unit 130 for calculating an estimated sending time placed under or pursuant to a contracted band of VC, a VC sorting unit 135 for selecting the most-preferentially transmitted VC from VC which fall into the same VP and the same service class, an EST of VP calculation unit 140 for calculating an estimated sending time made compliant with a contracted band of VP and fit even to the VC estimated sending time, a VP sorting unit 145 for selecting the most-preferentially transmitted VP from all the VP, and a cell sending unit 120 for determining the final sending of cell using the results of sorting by the VP sorting unit 145 and the VC sorting unit 135 and transferring the cell to the cell buffer unit 110.

The cell buffer unit 110 comprises a cell buffer 111 which serves as a buffer for temporarily storing each cell, a control memory for cell buffer 112 which serves as a buffer for storing therein cell buffer addresses for implementing queuing of ATM cells for each VC within the cell buffer 111 and storing therein information about queue lengths for each VC and VP, a cell buffer write controller 113 which serves as a control circuit for writing the cell received from the SAR 350 into the cell buffer, and a cell buffer read controller 114 for reading out a cell to be transmitted from the cell buffer to the light module.

The EST of VC calculation unit 130 includes a calculator for EST of VC 131 for calculating an estimated sending time of VC to which cell reception or transmission has been made (its specific calculating method will be described later).

Figure 7:
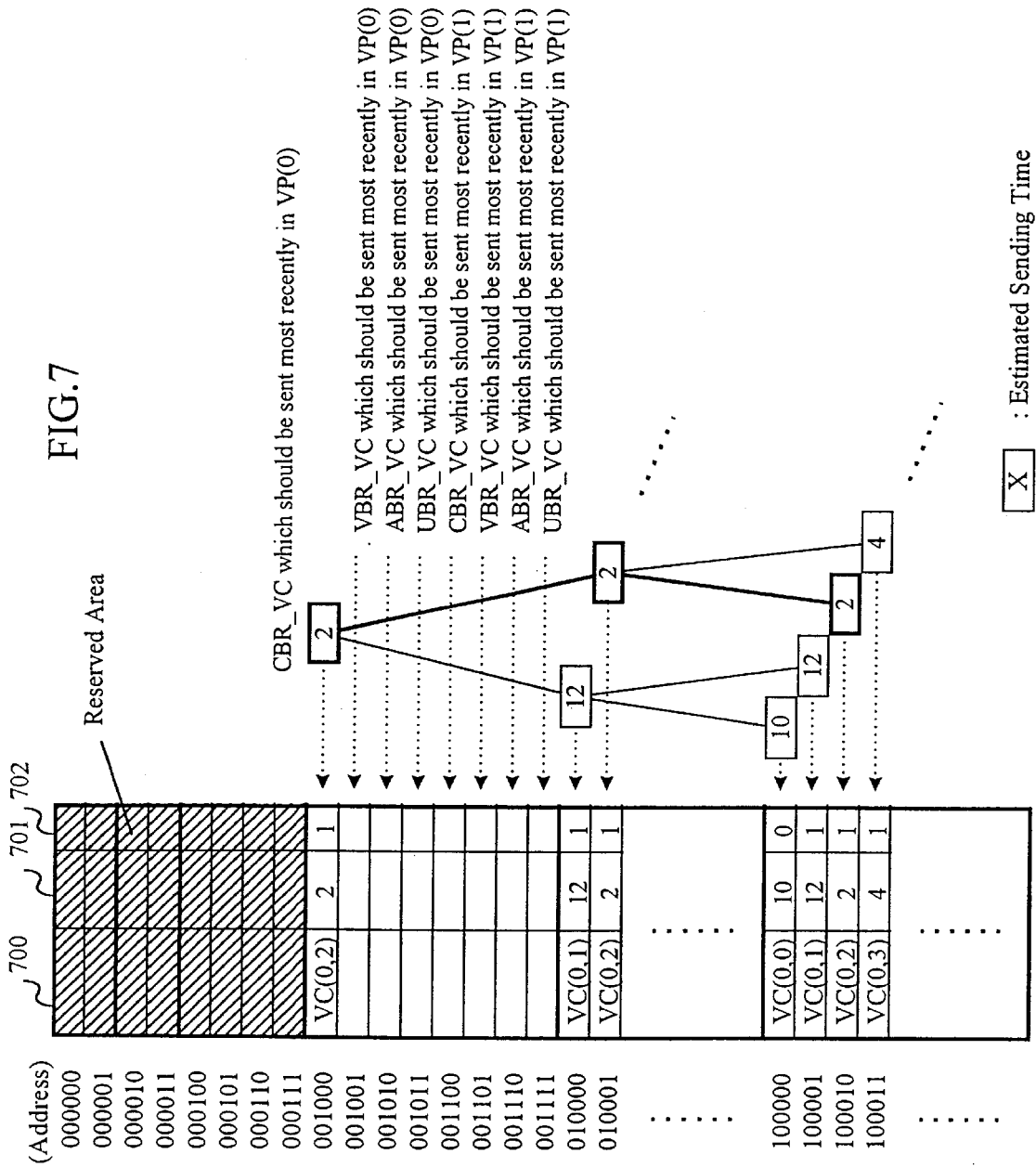
FIG. 7 is a diagram illustrating the relationship between a memory format of a memory for VP sorting 137 and a binary tree for VC.

The VC sorting unit 135 has a binary treeVC sorting circuit 136 for selecting the most-preferentially transmitted VC from within VP to which belongs the VC having been made the cell reception or transmission, and within the service classes. Further, the VC sorting unit 135 has a memory for VC sorting 137 which stores therein information required for the binary tree VC sorting circuit to perform sorting, for example, VC identification number, VC estimated sending time and VLD of VC. The VLD denotes a flag indicative of whether a transmission-wait cell exists in the corresponding VC. These three items will collectively be called hereinafter "VC sorting information". The VP sorting information is managed based on a binary tree, and a memory map thereof is shown in FIG. 7 (the details thereof will be described later).

The EST of VP calculation unit 140 comprises a calculator for EST of VP 141 for calculating an estimated sending time based on a contracted band of VP to which cell reception or transmission has been made, and a reviser for EST of VP 140 for revising the VP estimated sending time calculated by the calculator for EST of VP 141 to a value fit to the estimated sending time of VC (its specific calculating method will be described later).

Figure 6:
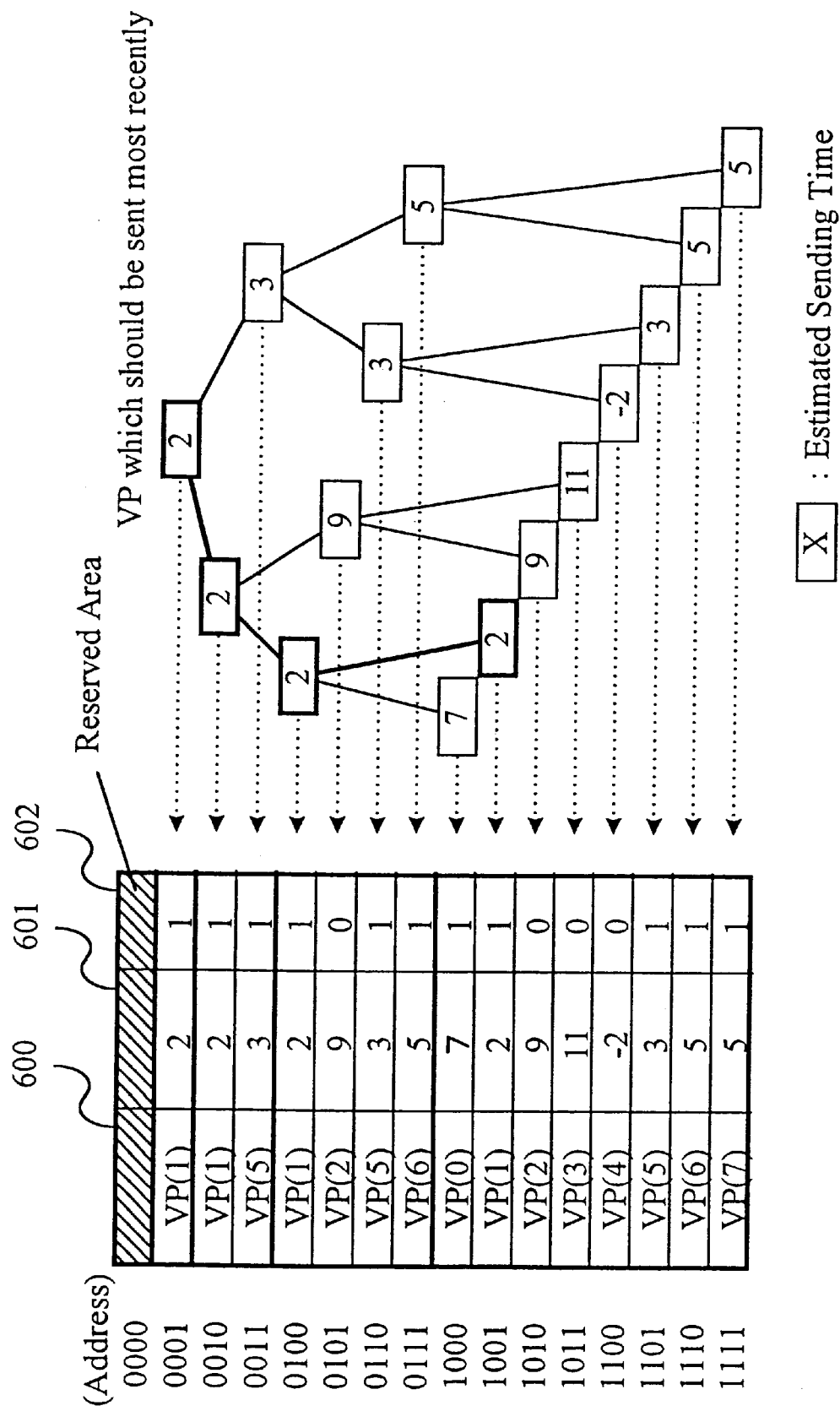
FIG. 6 is a diagram showing the relationship between a memory format of a memory for VP sorting 147 and a binary tree for VP.

The VP sorting unit 145 has a binary tree VP sorting circuit 146 for selecting the most-preferentially sent VP from all the VP. Further, the VP sorting unit 145 has a memory for VP sorting 147 which stores therein information required for the binary tree VP sorting circuit 146 to perform sorting, for example, VP identification number, VP estimated sending time and VLD of VP which is a flag indicative of whether a transmission-wait cell exists in the corresponding VP. These three items will collectively be called "VP sorting information". The VP sorting information is also managed by a binary tree and a memory map thereof is shown in FIG. 6 (the details thereof will be described later).

The traffic shaper 100 to which the present invention is applied, repeats the following six processes within the one-cell process time to receive one cell and send one cell. Here, the one-cell process time indicates the time required for the traffic shaping device to transmit and receive one cell (53 bytes). In the case of a traffic shaping device having a shaping capability of 155.88 Mbps(bit per second), for example, the one-cell process time results in 2.72 µs.

Process 1: Received cell determining process
Process 2: Calculation of estimated sending time upon reception of cell
Process 3: Sorting process upon reception of cell
Process 4: Sending VC selecting process
Process 5: Calculation of estimated sending time upon transmission of cell
Process 6: Sorting process upon transmission of cell of the six processes, the process 1 through process 3 correspond to processes at cell reception, and the process 4 through process 6 correspond to processes at cell sending.

The respective processes will be described below in detail with reference to FIGS. 1, 4 and 5.

In the following description, specified one of a plurality of VPs with VP identification numbers p is represented as VP(p). Similarly, VC identification numbers c are assigned to VCs to identify specified one of VCs belonging to VP(p) and represented as VC(p, c).

Process 1 (Received Cell Determining Process)

This is a process executed in a time designated at numeral 500 in FIG. 5 showing a timing chart of the traffic shaper to which the present invention is applied.

Each of cells, which has reached the traffic shaper 100, is temporarily stored in a queue for each VC. Described specifically, the cell buffer write controller 113 determines VP or VC to which the received cell belongs, based on a VPI (Virtual Connection Identifier) for identifying VP described in a header of the received cell and a VCI (Virtual Connection Identifier) for identifying VC. Next, the traffic shaper reads out an address of a non-used cell buffer area from the control memory for cell buffer 112 to effect VC-by-VC queuing on the received cells, and writes each received cell into an area indicated by the cell buffer address lying within the cell buffer 111 (see 400 and 401 in FIG. 4). The cell buffer address is stored in the control memory for cell buffer 112 as a cell buffer address at which the received cell is recorded.

In the following description, VP to which the received cell belongs, is defined as VP(r) and VC to which the received cell belongs, is defined as VC(r, s).

When the cell buffer write controller 113 receives each cell, it notifies a cell received signal 99 indicative of the reception of the cell to the calculator for EST of VC 131 of the EST of VC calculation unit and the calculator for EST of VP 141 of the EST of VP calculation unit. Simultaneously with the notification of the cell received signal 99 thereto, the cell buffer write controller 113 notifies VC identification numbers r and s to the calculator for EST of VC 131 and notifies a VP identification number r to the calculator for EST of VP 141, respectively.

Process 2 (Calculation of Estimated Sending Time Upon Cell Reception)

This is a process executed in times designated at numerals 502-1 and 502-2 in FIG. 5. The calculator for EST of VC 131 having received the cell received signal 99 calculates a VC estimated sending time of VC(r, s) in a unit of process time for one cell. The result of calculation is stored in the memory for VC sorting 137. The calculator for EST of VC 131 having received the cell received signal 99 makes a check as to whether VLD of VC(r, s) read out from the memory for VC sorting 137 of the VC sorting unit 135 is either '0' or '1', in order to determine whether a transmission-wait cell exists in the corresponding VC (see 402 in FIG. 4).

When it is found that VLD is '1', this indicates that the transmission-wait cell already exists in the corresponding VC. Thus, since the contracted band cannot be kept when the estimated sending time is updated, the estimated sending time should not be changed in this case.

On the other hand, when it is determined that VLD is '0', the contracted band is not kept upon updating of the estimated sending time where the already-calculated VC estimated sending time is in future when the present time is defined as the standard or criterion. Therefore, the estimated sending time should not be updated. However, when the already-calculated VC estimated sending time is the same time as the past or present time with the present time as the standard, the corresponding cell is placed in a state in which it may be transmitted at all times. Therefore, the estimated sending time may be updated to suitable time. Thus, when VLD is given as '0', the already-calculated VC estimated sending time is read out from the memory for VC sorting 137. Further, a check is made as to whether the corresponding time is in future or the same as the past or present time when the present time is defined as the standard (see 404 in FIG. 4).

When the former (future) is given, the VC estimated sending time remains unchanged. When the latter (past or present time) is taken, the VC estimated sending time is updated in the following manner (see 405 in FIG. 4) to send the cell of the corresponding VC earliest (the actual transmission of the cell is unknown).

VC estimated sending time=Present time+1.

In either case as described above, VLD of the corresponding VC is set to '1' (='1') when the cell received signal 99 is received (see 403 in FIG. 4).

Similarly, the EST of VP calculation unit 140 having received the cell received signal 99, calculates a VP estimated sending time. The VP estimated sending time is calculated according to just the same procedure as that for the calculation of the VC estimated sending time. Namely, VLD of VP(r) is checked. Further, the VP estimated sending time is updated in the following manner only when VLD is '0' and the already-calculated VP estimated sending time is the same time as the past or present time.

VP estimated sending time=Present time+1

At all other times, the already-calculated VP estimated sending time is not updated.

Since the VP estimated sending time can be calculated with just the same procedure as the calculation of the VC estimated sending time, it can be also calculated in time sequence by the same circuit. In the present embodiment, however, the calculator for EST of VC and the calculator for EST of VP corresponding to circuits independent of each other are respectively used so that the VC estimated sending time and the VP estimated sending time can be calculated in parallel on a time basis. Thus, their calculation time intervals can be shortened.

A calculation step of the calculator for EST of VP is not shown in FIG. 4. The calculator for EST of VP calculates the VP estimated sending time in parallel with Steps 402 through 405 in FIG. 4.

Process 3 (Sorting Process Upon Cell Reception)

This process can be divided into the following three processes:

Process 3-1: VC sorting process upon cell reception

Process 3-2: revision of VP estimated sending time upon cell reception

Process 3-3: VP sorting process upon cell reception

They will be described in order below.

Process 3-1 (VC Sorting Process Upon Cell Reception)

This is a process executed in a time 506 subsequent to a time calculation 502 in FIG. 5. When a VC estimated sending time of VC(r, s) is updated, there is a possibility that VC (hereinafter called interim transmission VC) to transmit a cell earliest will change in VP(r) and a service class to which VC(r, s) belongs. Therefore, the binary tree VC sorting circuit 136 performs sorting for determining the interim transmission VC (see 406 in FIG. 4).

A method of selecting the corresponding interim transmission VC in the same VP and the same service class will be explained below. In the interest of simplicity, an example for selecting the corresponding one from eight VC (VC(p, 0) through VC(p, 7)) will be described with reference to FIGS. 9 and 10.

The relationship between information stored in respective elements of a binary tree will first be explained. In the following description, the top 900 of the binary tree and the bottoms 930 through 937 are called a root and leaves in FIG. 9, respectively. Further, each element located on the root side as viewed from an arbitrary element is called a master and two elements located on the leaf side are called slaves.

Figure 9:
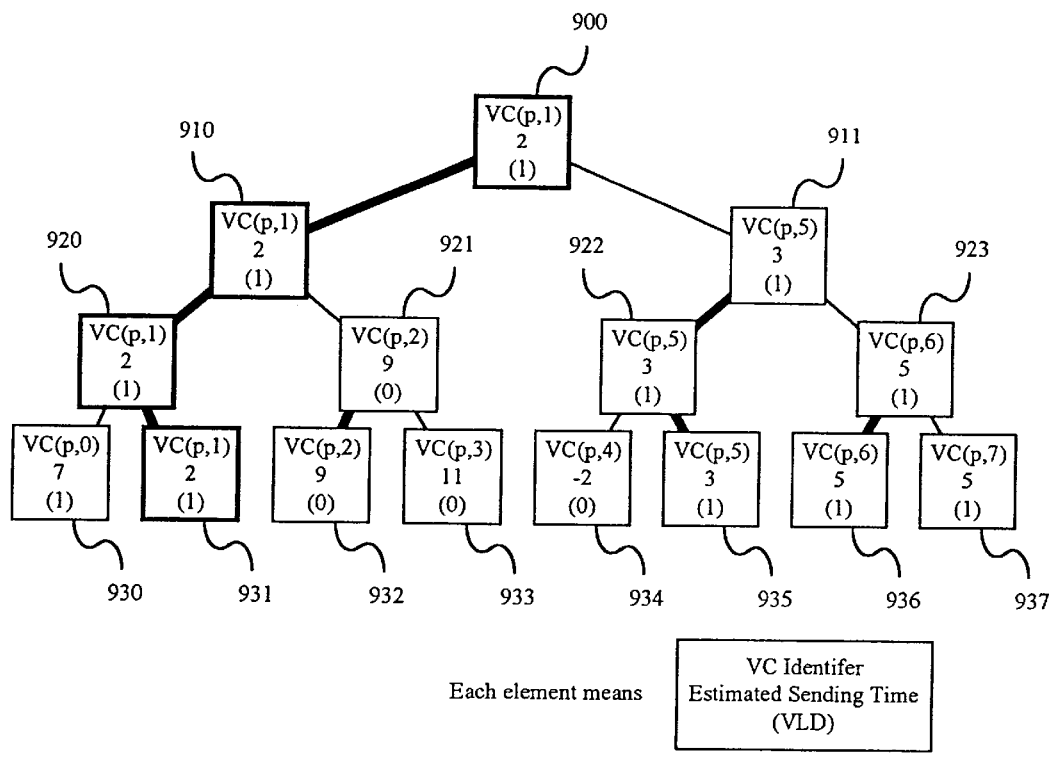
FIG. 9 is a diagram showing the relationship between information stored in respective elements of a binary tree for VC.
Figure 10:
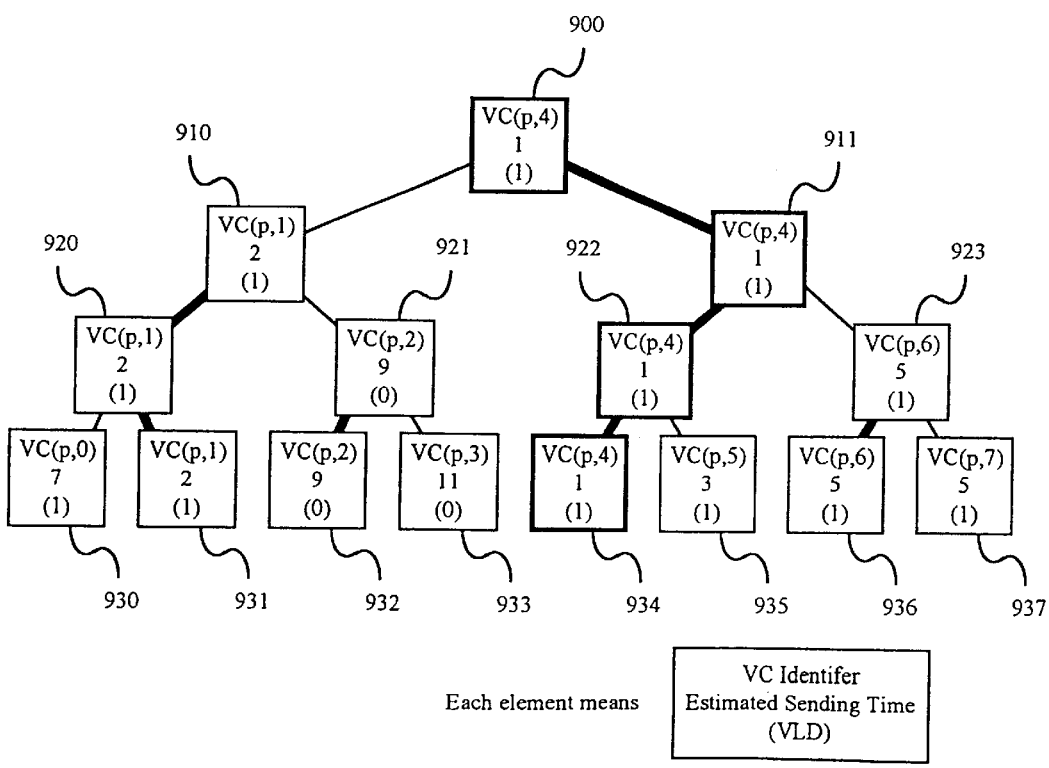
FIG. 10 is a diagram illustrating the relationship between information stored in respective elements of a binary tree for VC.

Estimated sending times for respective VC and VLD are stored in their corresponding leaves 930 through 937 of the binary tree which are arranged in the order of VC identification numbers. In FIGS. 9 and 10, numerical value (0 or 1) inside the parenthesis indicates VLD. VC identification numbers, estimated sending times and VLD are respectively stored in other elements other than the leaves. Finally, information about VC, which meets the following conditions, is stored in the root.

Condition 1: VLD is '1', wherein VC having a transmission-wait cell is selected in preference to VC having no transmission-wait cell.

Condition 2: Estimated sending time is early, wherein VC to be transmitted in top priority at all times is selected.

In order to select VC satisfying the condition 1 and condition 2 as VC to be stored in the root, information of either of two slaves is stored in other elements excluding the leaves in accordance with the following rule 1 through rule 3 as it Rule 1: When VLD of the slaves are both '1', the corresponding slave in which the estimated sending time is in the further past, is selected to meet the condition 2. For instance, information of the element 931 is stored in the element 920 of the binary tree as it is, and the VC identification number results in VC(p, 1). Either of them may be taken when the time is the same.

Rule 2: When VLD of one slave is '1' and VLD of the other is '0', the slave in which VLD is '1', is selected without condition to meet the condition 1. For example, the element 935 is selected even though the element 934 is in the past in estimated sending time, and information thereof is stored in an element 922 of the binary tree as it is.

Rule 3: When VLD of the slaves are both '0', the slave in which the estimated sending time is in the further past, is selected to meet the condition 2. For example, information of the element 932 is stored in an element 921 of the binary tree as it is, and the VC identification number results in VC(p, 2). Either of them may be taken in the case of the same time.

The binary tree having such a structure is provided four for each VP, which are assigned to CBR, VBR, ABR and UBR respectively. An identification number of VC (interim transmission VC) to be transmitted most preferentially in CBR, an estimated sending time and VLD are stored in the root of the binary tree for CBR.

The binary tree is configured in accordance with the rules. It is however considered that since the estimated sending time and VLD change when the cell is received, the information in the binary tree changes and the interim transmission VC changes. However, all the information in the binary tree will not be updated here.

Consider where in FIG. 9 by way of example, a cell of VC (p<4)(corresponding to the leave 934) is received and the estimated sending time and VLD of the corresponding VC are updated. The elements of the binary tree to be updated are only those lying in a route from the element 934 with the information of the corresponding VC stored therein to the root 900. In the present example, only the information of the elements designated at numeral 922, 911 and 900 are updated in accordance with the rule 1 through rule 3 in this order, so that the VC to be transmitted in top priority is stored in the root 900 of the binary tree and the structure of binary tree is maintained (see FIG. 10). It is possible to select the interim transmission VC in the same VP and the same service class in accordance with the procedure. Incidentally, the actual address assignment of the memory for VC sorting 137 and the like will be described later.

Process 3-2 (Revision of VP Estimated Sending Time Upon Cell Reception)

Next, the VP estimated sending time based on the VP contracted band, which is calculated by the calculator for EST of VP 141, is revised to a value fit to the VC estimated sending time by the reviser for EST of VP 142 (see 407 in FIG. 4). This is a process executed in a time designated at numeral 507 in FIG. 5.

Figure 8:
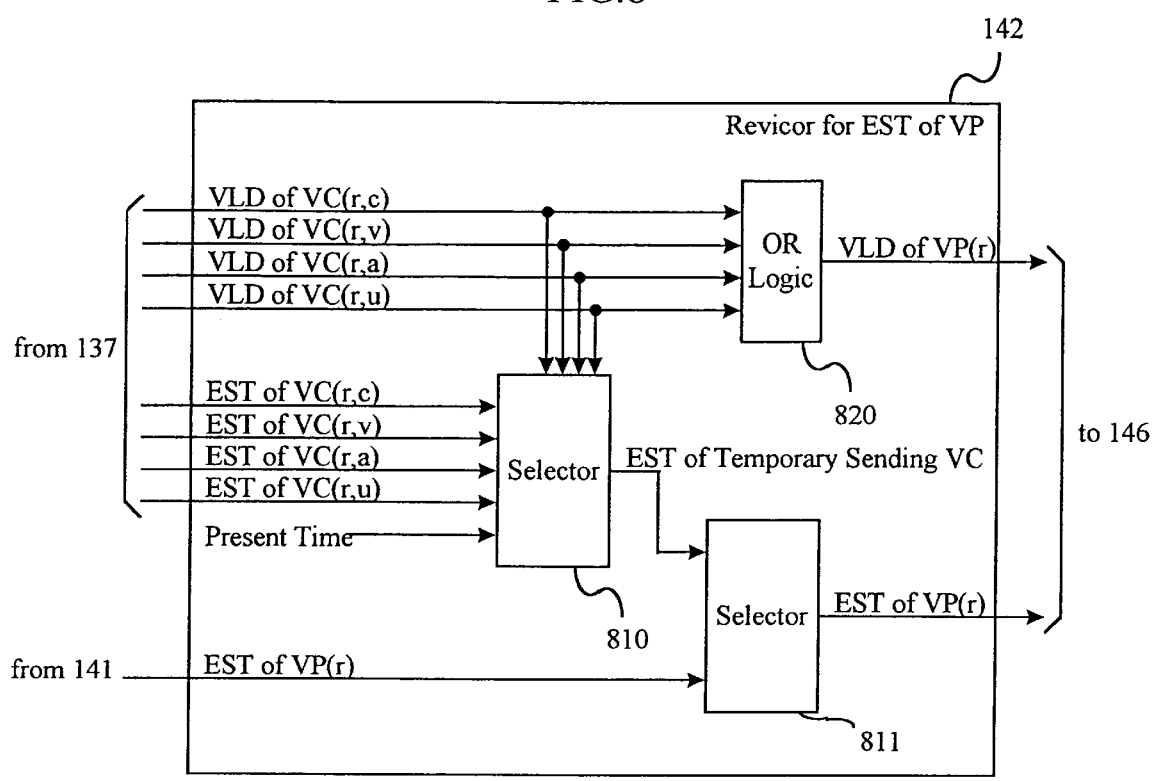
FIG. 8 is a detailed block diagram depicting a structure of a reviser for EST of VP 142.

FIG. 8 is a detailed block diagram of the reviser for EST of VP 142. When VP sorting is performed using the VP estimated sending time calculated by the calculator for EST of VP 141 as it is, there may be a case in which even if VP is in a transmittable state, even VC to be transmitted in top priority within the corresponding VP is in a state of being unable to send. Since both a bandwidth for self VP and a bandwidth for the other VP cannot be utilized to the utmost in this case, the VP estimated sending time revising process is required. Described specifically, the following processing is performed. Incidentally, interim transmission VC of CBR in VP(r) selected by the binary tree VC sorting circuit 136 is defined as VC(r, c), interim transmission VC of VBR is defined as VC(r, v), interim transmission VC of ABR is defined as VC(r, a) and interim transmission VC of UBR is defined as VC(r, u), respectively.

First of all, a selector 810 shown in FIG. 8 calculates the time which has been in the most past on a time basis, of the estimated sending times of VC(r, c), VC(r, v), VC(r, a) and VC(r, u) read out from the memory for VC sorting 137, as an interim VC estimated sending time. However, each vC at which VLD is '0', is not included in the time calculation. When VLD of VC(r, c), VC(r, v), VC(r, a) and VC(r, u) are all '0', the interim VC estimated sending time is defined as the present time. The interim VC estimated sending time indicates the time at which VC of a plurality of VC belonging to VP(r) can be transmitted earliest. In other words, if the present time reaches the interim VC estimated sending time, then at least one VC of VP(r) is able to send the corresponding cell. Whether or not the contracted band of VP(r) has been kept, is another problem.

Next, a selector 811 shown in FIG. 8 compares the time calculated by the calculator for EST of VP 141 and the interim VC estimated sending time obtained in the selector 810 and selects the further future time from the result of comparison as an estimated sending time of VP(r). Thus, the selected estimated time of VP(r) indicates the earliest time at which one or more transmittable VC obeys or keeps the contracted band as VP(r) and exist in VP(r). In other words, if the present time reaches the estimated sending time of VP(r), then at least one VC in VP(r) is able to send the corresponding cell while keeping the contracted band of VP(r).

On the other hand, an OR logic 820 shown in FIG. 8 sets VLD of the corresponding VP to '1' if any VLD of VC(r, c), VC(r, v), VC(r, a) and VC(r, u) obtained from the memory for VC sorting 137 is '1'.

Process 3-3 (VP Sorting Process Upon Cell Reception)

This is a process executed in a time designated at numeral 508 in FIG. 5. As mentioned above, VP sorting information for each VP is managed by a binary tree. When the VP estimated sending time of VP(r) is brought to up to date in a manner similar to VC, there is a possibility that VP (hereinafter called interim transmission VP) to be transmitted the earliest will change. Therefore, the binary tree VP sorting circuit 146 performs sorting (see 408 in FIG. 4).

The binary tree sorting circuit 146 is identical in operation to the binary tree sorting circuit 136, and a VP identification number, an estimated sending time and VLD for VP to be transmitted in top priority, of all VP are stored in the root of a binary tree for VP. Incidentally, the actual address assignment of the memory for VP sorting 147 and the like will be described later.

Process 4 (Sending VC Selecting Process)

This is a process executed in a time designated at numeral 509 in FIG. 5. When the VC estimated sending time (or VP estimated sending time) is the same time as the past or present time with the present time as the standard from the result of comparison between the present time and each VC estimated sending time (or VP estimated sending time), the corresponding VC (or VP) will be called transmittable state. The interim transmission VP selected by the binary tree VP sorting circuit 146 is defined as VP(i), and interim transmission VC in the respective service classes of VP(i) are defined as VC(i, c), VC(i, v), VC(i, a) and VC(i, u) respectively.

The cell sending unit (sending controller) 120 always reads out VLD and an estimated sending time from an address corresponding to the root of the memory for VP sorting 147, and sets VLD='1' and compares the estimated sending time and the present time. Thus, the cell sending unit 120 monitors whether VP(i) is brought to the transmittable state, and sends a sending permission signal 95 to the cell buffer read controller 114 to transmit a cell placed in the transmittable state. When it is found that VP(i) is not in the transmittable state, any cell is not transmitted. When VP(i) is in the transmittable state, the cell sending unit 120 performs class-to-class priority control related to the order or sequence of transmission between the interim transmission VC in the respective service classes, i.e., VC(i, c), VC(i, v), VC(i, a) and VC(i, u) (see 409 and 410 in FIG. 4).

The class-to-class priority control includes, for example, Head of Line control, Weighted Round Robin control, etc. The Head of Line control is a priority control method of giving priority to high-order classes completely. When a transmission-wait cell exists in each upper or high-order class (CBR>VBR>ABR>UBR), cells in the low-order classes are not transmitted. While a cell of VC, which belongs to the highest-order class, is transferred with the minimum delay in this case, the cells in the low-order class are not transmitted until the cells in the high-order classes ceases to exist. The Weighted Round Robin control is used to assign a predetermined band even to the low-order classes.

The rate between transmission bandwidths, for example, the rate in cell transmission of high-order class to low-order class can be controlled to 2:1 or 4:1 or the like. Even in the case of either priority control, VCs at which VLD of VC(i, c), VC(i, v), VC(i, a) and VC(i, u) are '0' and VCs placed in the non-transmittable state, at which the estimated sending time is in future with the present time as the standard or criterion, have no cells to be transmitted even if selected finally. Therefore, they are handled as being the lowest priority.

VC selected as a result of execution of the class-to-class priority control from VC(i, c), VC(i, v), VC(i, a) and VC(i, u) is defined as VC(i, j) and the corresponding cell of VC(i, j) is transmitted. Described specifically, the sending permission signal 95 is sent to the cell buffer read controller 114. The cell buffer read controller 114 having received the sending permission signal 95 reads out the corresponding cell from the cell buffer unit 110 by using a cell buffer address read out from the control memory for cell buffer 112. The cell buffer read controller 114 sends the cell to the line interface 324 (see 411 in FIG. 4).

In order to revise the next cell estimated sending times of VP(i) and VC(i, j) each having transmitted the cell, the cell sending unit 120 notifies a cell sending signal 98 to the EST of VC calculation unit 130 and the EST of VP calculation unit 140. Simultaneously with the notification of the cell sending signal 98 thereto, the cell sending unit 120 notifies VC identification numbers i and j to the calculator for EST of VC 131 and notifies a VP identification number i to the calculator for EST of VP 141, respectively.

Process 5 (Calculation of Estimated Sending Time Upon Cell Sending)

This is a process executed in times designated at numerals 512-1 and 512-2 in FIG. 5.

The EST of VC calculation unit 130 and the EST of VP calculation unit 140 each having received the cell sending signal 98 calculate the next cell estimated sending times which comply with the contracted band (see 412 in FIG. 4). The calculation of the following cell estimated sending times is performed using a leaky-bucket system, for example. The leaky-bucket system has been described in, for example, "The ATM Forum TM4.0 Normative Annex C: Traffic Contract Related Algorithms and Procedures (P.71)" (Prior Art 3).

Alternatively, the following is considered as a method of calculating other cell estimated sending times. Namely, a sending interval value corresponding to a contracted band is stored and the following calculation may be performed in this condition.

Next cell estimated sending time=Cell estimated sending obtained this time+Sending interval value When cells (transmission-wait cells) still remain in VC-by-VC queues even if cells of VC(i, j) are transmitted, it is natural that the next estimated sending time should be calculated. However, the next estimated sending time is calculated even in the case where the VC-by-VC queues become empty (no transmission-wait cells exist). This is required to keep the contracted band and transmit the corresponding cell even when the cells of VC(i, j) are received with the next cell receiving timing, for example.

Incidentally, the next cell estimated sending time may be set in the following manner to allow the transmission of each cell at all time when a contract related to a transmission bandwidth is not made in VC of the UBR class:

Next estimated sending time=Cell estimated sending time obtained this time+1

When the cells remain in the VC-by-VC queues, VLD is set to '1'. When the VC-by-VC queues become empty, VLD is set to '0'. The calculation of each estimated sending time referred to above is just the same as for VP.

Process 6 (Sorting Process Upon Cell Sending)

This process can be divided into following three steps.

Process 6-1: VC sorting process upon cell sending

Process 6-2: Revision of VP estimated sending time upon cell sending

Process 6-3: VP sorting process upon cell sending

These process are executed in times designated at numerals 513 through 515 in FIG. 5. The details of sorting is just the same as at cell reception.

Since there is a possibility that the interim transmission VC and the interim transmission VP will change when the cell estimated sending time is revised, the binary tree VC sorting circuit 136 and the binary tree VP sorting circuit 146 perform sorting respectively (see 413 through 415 in FIG. 4).

The processes corresponding to the process 1 through process 6 are performed within a process time for one cell and repeated from the process 1 again.

A method of managing VP sorting information stored in the memory for VP sorting 147 and information stored in the memory for VC sorting 137 will next be explained with reference to FIGS. 6 and 7. In the following description, the number of supportable VP is defined as M (=m-th power of 2) and the number of VC tied in a bundle within the respective VP is defined as N (=n-th power of 2).

FIG. 6 shows the relationship between a storage format of the memory for VP sorting 147 and a binary tree for VP. The relationship between respective elements of the binary tree for VP and addresses of the memory for VP sorting 147 is represented as shown below. In the following description, the addresses are given in the form of a binary number (m+1 bit)

R1: An address corresponding to the root of the binary tree is given as an address of "000 . . . 001".

R2: Addresses: an address of a master corresponding to an element given as an address of "xyy . . . yyz" is given as an address of "0xy . . . yyy", and addresses for two slaves are respectively given as an address of "yyy . . . yzo" and an address of "yyy . . . yz1".

When information are successively stored in accordance with the rules R1 and R2, addresses corresponding to leaves of the binary tree are stored at addresses ranging from an address of "1100 . . . 000" to an address of "111 . . . 111" (corresponding to m-th power of 2=M in total).

An address generator for a memory access made upon sorting can be simply configured by managing the addresses in the memory in accordance with the rules. Namely, the opposite party to be compared with the address of "xyy . . . yyz" is information stored at an address of "xyy . . . yy(z)" where(z) indicates the inverse of the value of z, and the result of comparison is written into an address of "0xy . . . yyy".

Thus, the sorting for the M elements can be performed by m shift operations and m inverse operation. A memory map of the memory for VP sorting 147 at eight VPs (m=3) is shown in FIG. 6 by way of example. As mentioned above, a VP identification number 600, a VP estimated sending time 601 and VLD 602 of VP are stored in the memory for VP sorting 147.

While the method of managing the VP sorting information has been described using FIG. 6, the management of VC sorting information can be also performed in just the same manner as described above.

FIG. 7 shows a memory map of the memory for VC sorting 137 at the time that four service classes are supported within two VP (m=1). The memory for VC sorting 137 stores VC storing information in just the same manner as that for the memory for VP sorting 147 but is different therefrom only in that sorting is terminated when one VC is selected for each VP and for each service class. In the present example, the sorting is completed when eight VCs have been selected.

Figure 11:
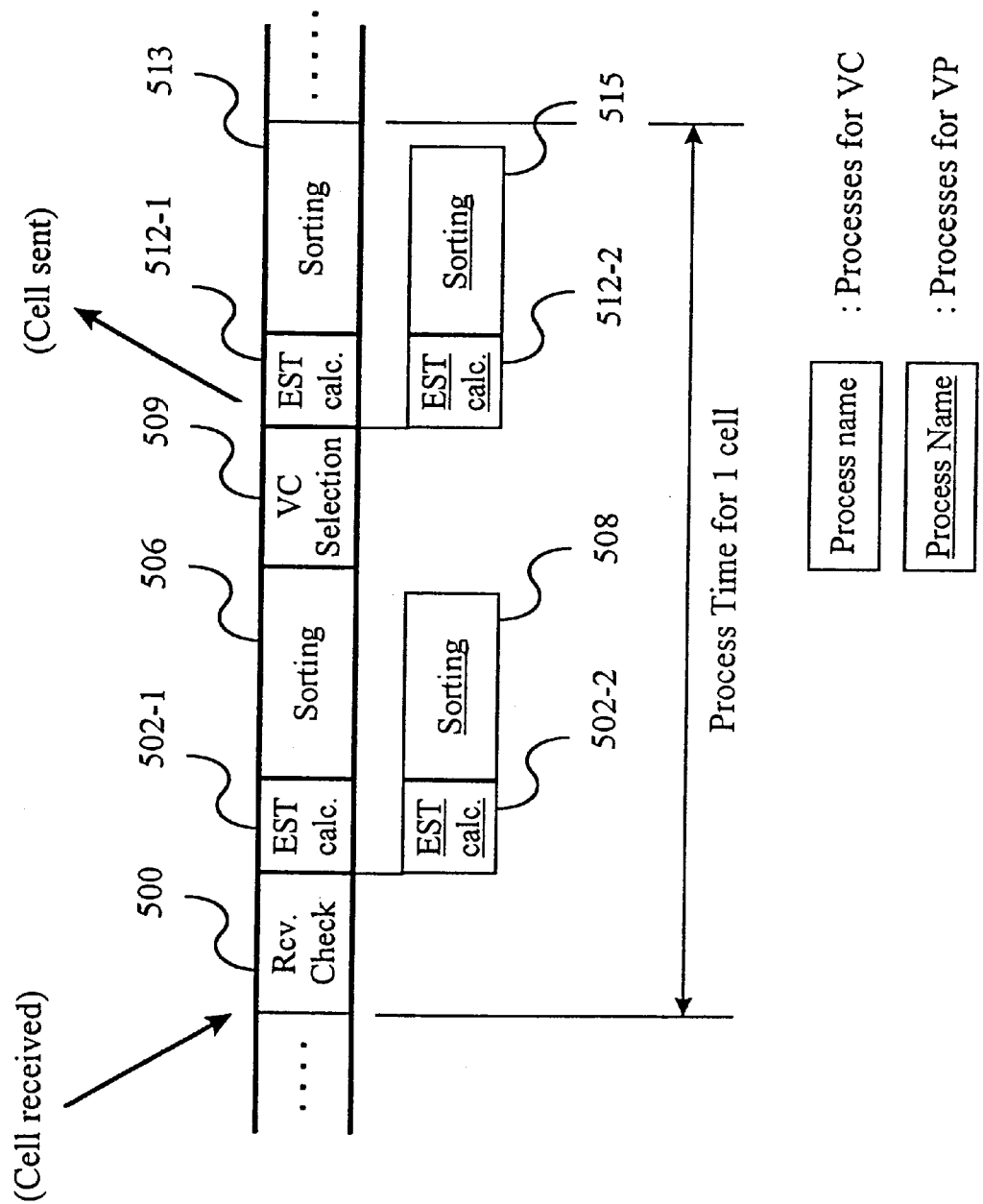
FIG. 11 is a timing chart of the traffic shaper at the time that a pair of a calculator for EST of VP and a sorting circuit is used on a time-shared basis.

While the information about the VC estimated sending time is reflected on the VP estimated sending time to maximize the utilization of the contracted bandwidth for self VP and the bandwidth for the line according to the operation of the reviser for EST of VP 143 in the embodiment, the VP estimated sending time and the VC estimated sending time may be calculated completely independent of each other. It is considered in this case that while the present time has reached the VP estimated sending time as described above, sending timing for self VP is skipped when the present time does not reach the VC estimated sending time because the waiting for attainment of the present time to the VC estimated sending time greatly reduces the availability of the line bandwidth. In this case, the transmission bandwidth for self VP is slightly reduced. Since, however, the VC sorting and VP sorting can be performed in parallel as indicated by a timing chart shown in FIG. 11, the process time required to perform sorting can be greatly reduced. If the number(= M) of supported VPs and the number(=N) of VCs tied in the bundle within the respective VP are approximately equal to each other, the time required to perform sorting can be reduced to ½ at maximum.

While the embodiment has shown the case in which the traffic shaper according to the present invention has been applied to the ATM source end system, the traffic shaper might be placed in important points lying within the network such as each point relayed from the private network to the public network in addition to the ATM source end system.

Figure 12:
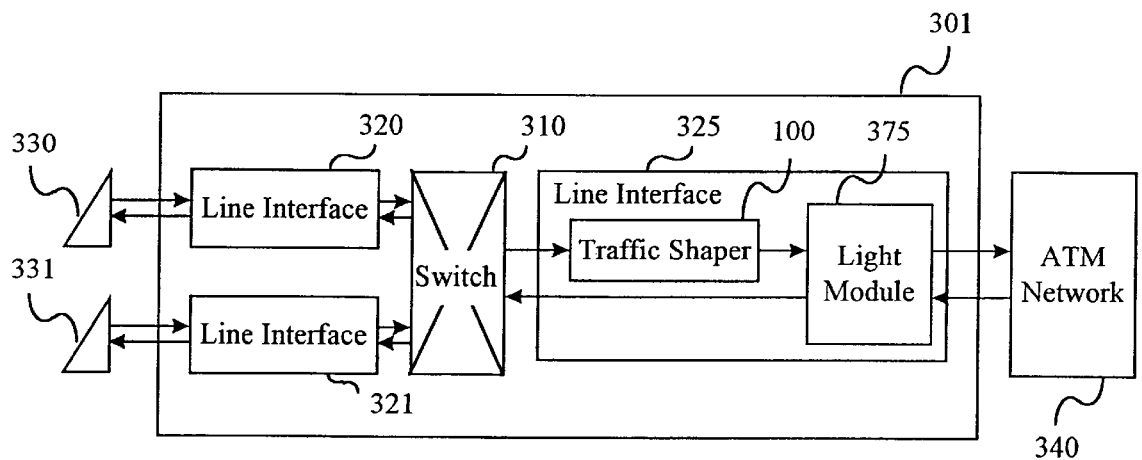
FIG. 12 is a diagram showing a configuration of an ATM switching system to which a traffic shaper to which the present invention is applied, is applied as a VP shaping device.

FIG. 12 shows a configuration of an ATM exchanger or switching system 301 connected to a public ATM network 340, to which the traffic shaper according to the present invention is applied.

The ATM switching system 301 comprises line interfaces 320 and 321 respectively corresponding to ATM terminals 330 and 331, a switch 310, a line interface 325 for the public ATM network 340, a traffic shaper 100 corresponding to the public ATM network, and a light module 375.

A traffic shaper of a trunk system wherein traffic shaping for a plurality of lines is performed by one traffic shaper, will be explained as an embodiment 2 of the present invention.

Figure 13:
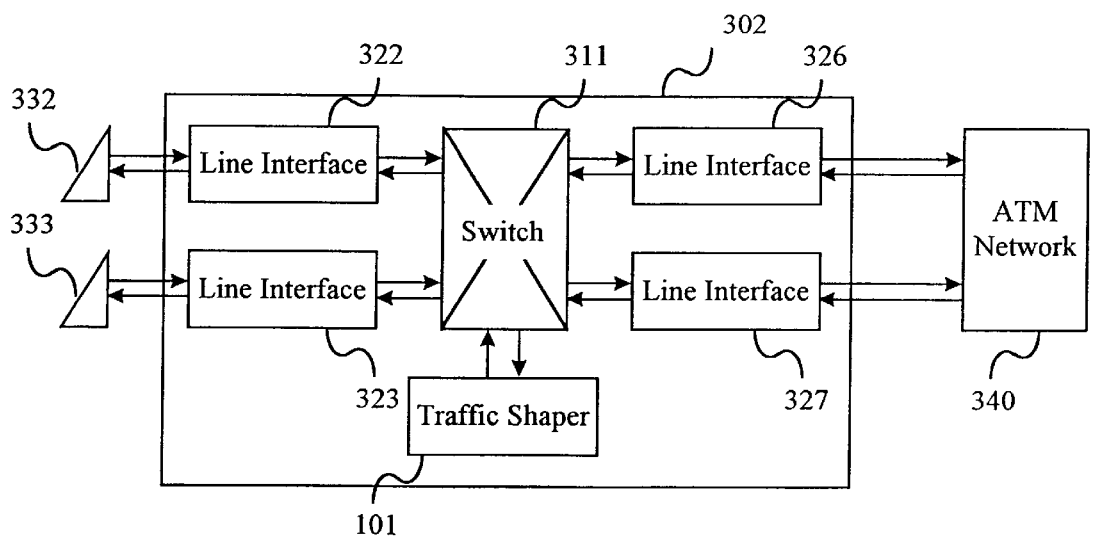
FIG. 13 is a diagram illustrating a configuration of an ATM switching system to which a traffic shaper to which the present invention is applied, is applied as a trunk type shaping device.

FIG. 13 shows an example of a configuration of an ATM switching system to which a traffic shaper is applied as the traffic shaping device or shaper of the trunk system. Cell flows generated at terminals 332 and 333 are inputted to a switch 311 through line interfaces 322 and 323 of the ATM switching system 302. Even when any of lines for output destinations is determined by the switch 311, each cell is temporarily transferred to a traffic shaper 101. The traffic shaper 101 takes the VP sorting executed in the embodiment 1 as line sorting and performs just the same operation.

Each cell outputted from the traffic shaper 101 is transmitted from line interfaces 326 and 327 for the respective output lines to the public ATM switching system 340 through the switch 311 again. When the cell outputted from the traffic shaper 101 is stored in a cell buffer of the switch, the executed traffic shaping loses its meaning. Therefore, the cell transmitted from the traffic shaper 101 must be transferred to the network in top priority.

Further, a VP shaping device or shaper using a trunk system can be configured as an embodiment 3 constructed by utilizing the shapers according to the embodiments 1 and 2 in combination.

The present shaper is precisely identical in structure to the traffic shaper shown in FIG. 13. However, the traffic shaper 101 performs traffic shaping in three stages of shaping in VC units, shaping in VP units and shaping in line units. A pair of EST calculator and a sorting circuit are prepared for each VC, VP and line units. When all is brought to a transmittable state, the traffic shaper sends the corresponding cell therefrom. In a manner similar to the embodiment 2, each cell to be sent from the traffic shaper 101 must be transferred to the public ATM switching system 340 in top priority.

While the embodiments of the present invention with respect to the ATM network have been described above, the present invention is not specialized on the ATM. The traffic shaping can be effected even on a variable length packet in the same manner as described above.

A description will next be made of a traffic shaper for an IP packet as an embodiment 4. The length of the IP packet is 64 K bytes at maximum.

Figure 15:
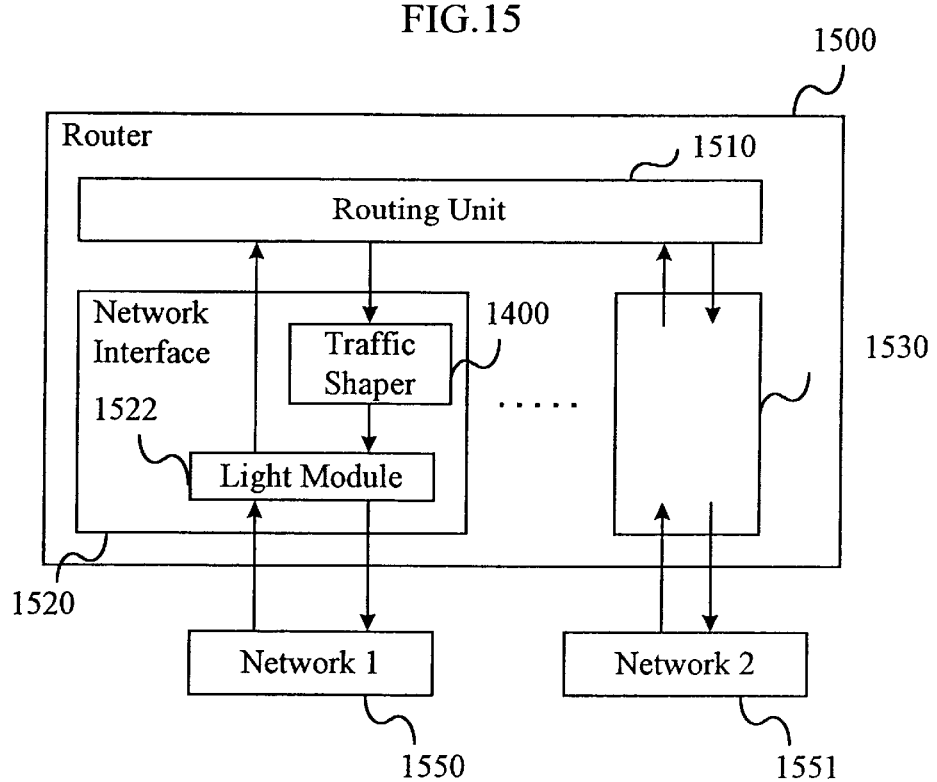
FIG. 15 is a block diagram showing one example of a configuration of a router.

FIG. 15 is a diagram showing one example of a configuration of a router.

The router 1500 comprises network interfaces 1520 and 1530 respectively corresponding to a packet transfer network 1(1550) and a packet transfer network 2 (1551), and a routing unit 1510 for determining each destination by referring to a header of an IP packet and sending the IP packet to the network interface corresponding to the destination. Further, each of the network interfaces 1520 and 1530 comprises a traffic shaper 1400 and a light module 1522 for transforming a packet to a signal corresponding to a physical line such as an optical fiber and sending it therefrom. Inverse transformation thereof is also performed by the light module.

Figure 14:
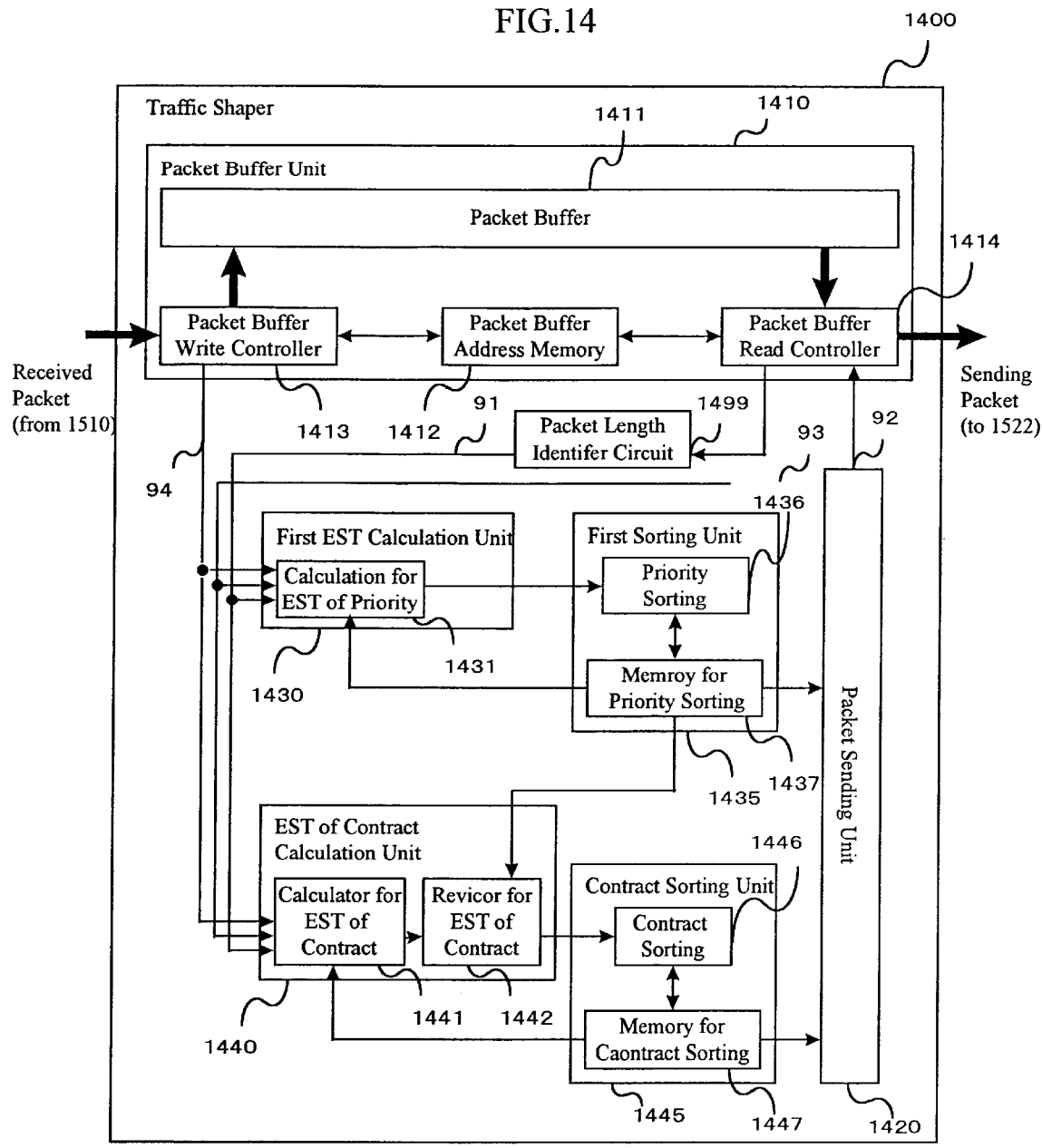
FIG. 14 is a block diagram depicting a configuration of one embodiment of a traffic shaper for an IP packet, to which the present invention is applied.

FIG. 14 is a block diagram showing a configuration of the traffic shaper 1400 shown in FIG. 15 corresponding to the IP packet.

The IP packet-compatible traffic shaper 1400 to which the present invention is applied, is different from the traffic shaper shown in FIG. 1 only in that the process for the ATM cell by the traffic shaper 100 is converted to a process for the IP packet and a packet length identifier circuit 1499 for identifying IP packet length information described in each IP packet header when a packet buffer read controller 1414 reads out an IP packet from a packet buffer, is added thereto.

The identified packet length is used to calculate estimated sending times by a calculation for EST of Priority 1431 of a first EST calculation unit 1430 and a calculator for EST of contract 1441 of an EST of contract calculation unit 1440.

Figure 16:
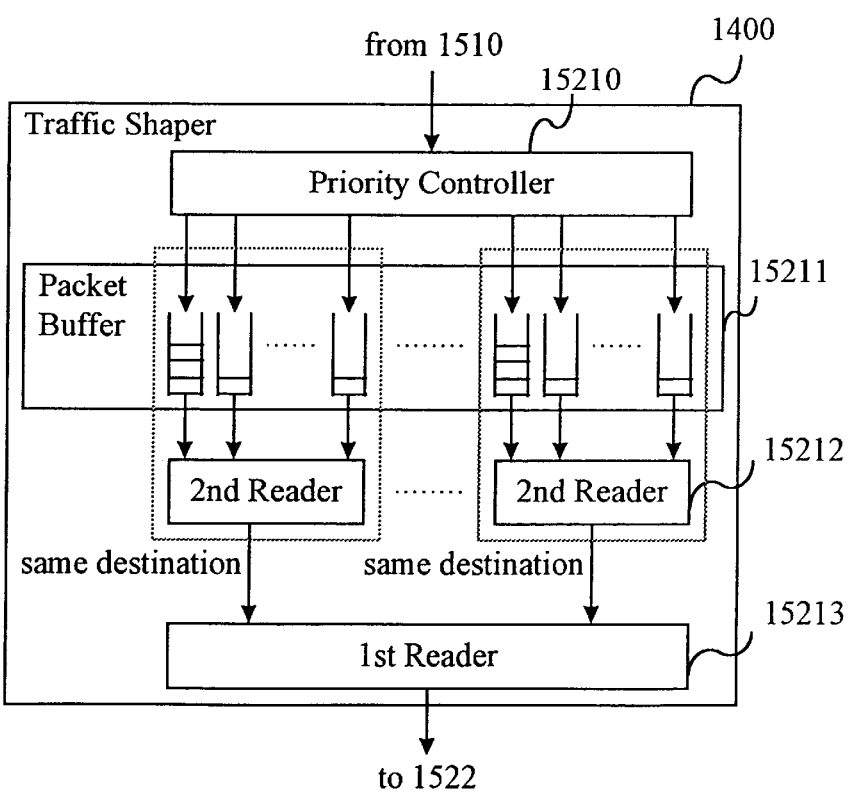
FIG. 16 is a diagram illustrating the concept of band control of the traffic shaper for the IP packet.
Figure 19:
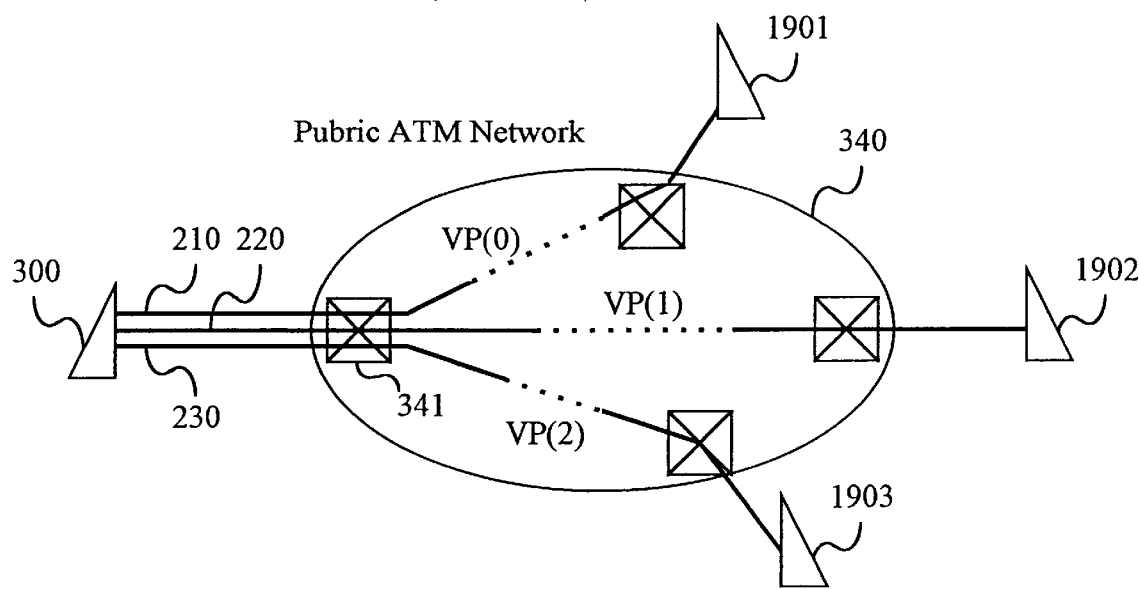
FIG. 19 is a diagram illustrating a network configuration at the time that contracts are established in VP units.

FIG. 16 shows the concept of band control on each IP packet by the traffic shaper 1400.

Received IP packets are distributed to queues set every destinations and every packet priorities in a priority controller 15210 and subjected to queuing within a packet buffer 15211. In the packet transmission, a first reader circuit 15213 selects a destination placed in a transmission-permitted state (i.e., selects one from a plurality of destination candidates in FIG. 16). A second reader circuit 15212 corresponding to the selected destination performs priority control in a sending sequence of packets to thereby read out IP packets from the packet buffer in decreasing order of priority and transfers the IP packet to a light module 1522. By doing so, the packets are transmitted in decreasing order of priority among destinations placed in a transmittable state.

When the respective circuits shown in FIG. 16 are correlated with the circuits shown in FIG. 14 respectively, a priority controller 15210 shown in FIG. 16 can be implemented as a packet buffer write controller 1413 shown in FIG. 14, the second reader 15212 shown in FIG. 16 can be implemented as a first sorting unit 1435 shown in FIG. 14, and the first reader 15213 shown in FIG. 16 can be implemented as a contract sorting unit 1445 shown in FIG. 14, respectively.

The following processes corresponding to a process 1 through a process 6 are performed in a manner similar to the ATM cell to transmit and receive each IP packet.

Process 1: Received packet determining process

Process 2: Calculation of estimated sending time upon packet reception

Process 3: Sorting process upon packet reception

Process 4: Sending packet selecting process

Process 5: Calculation of estimated sending time upon packet sending

Process 6: Sorting process upon packet sending

The Process 2 through Process 4 and Process 6 are the same as those for the ATM cell having a fixed length.

The received packet determining process (process 1) and the calculation of the estimated sending time (Process 5) will be explained below.

Process 1 (Received Packet Determining Process)

In the case of the ATM cell, the VP1 (Virtual Path Identifier) and VCI (Virtual Connection Identifier) are described in the header of each cell. It was therefore possible to determine, based on these information, VP or VC to which the corresponding cell belonged. In the case of the IP packet, on the other hand, contract units, which corresponds to VP in ATM, under which a user makes a contract with a network, can be associated with the combination of the transmission source addresses and destination addresses described in the headers of the respective IP packets. The priority of each packet, which corresponds to VC in ATM, is described in the 0th to 2nd bits of a TOS (Type of Service) field of the IP packet header.

In the traffic shaper to which the present invention is applied, the packet buffer write controller 1413 refers to the headers of the received IP packets to determine the destination and priority of each received packet, and queues the packets into queues provided every destinations and every priorities within the packet buffer 1411.

Process 5 (Calculation of Estimated Sending Time Upon Packet Transmission)

The calculation for EST of Priority 1431 and the calculator for EST of contract 1441 having received a packet sending signal 93 calculate the estimated sending times for the next packet according to a contracted bandwidth in a manner similar to the ATM cell. At this time, transmission or sending intervals having a fixed value cannot be used because a packet length is variable as distinct from the ATM cell.

In FIG. 17, (1) shows a sequence of packets 1700, 1701 and 1702 each having a short packet length transmitted with a fixed sending intervals and (2) shows a sequence of packets 1710, 1711 and 1712 each having a relatively long packet length transmitted with the same fixed sending interval. It is understood that when the cases (1) and (2) are compared with each other, the case (2) can increase the number of sending bytes. Thus, when traffic shaping is effected on variable length packets, it is necessary to provide a process for varying each sending interval according to the packet length.

In the present invention, there is provided a packet length identifier circuit 1499 for identifying the packet length. The packet length identifier circuit 1499 refers to the packet length information described in each IP packet header when the packet buffer read controller 1414 reads out the IP packet from the packet buffer 1411. The packet length information 91 referred to by the packet length identifier circuit 1499 is sent to the calculator for EST of Priority 1431 and the calculator for EST of contract 1441.

The calculator for EST of Priority 1431 and the calculator for EST of contract 1441 each having received the packet length information 91 perform the following calculation, for example, and determines a sending interval to be used for the calculation of each estimated sending time.

Sending interval=(Reference sending interval)×(Sending IP packet length)

where the reference sending interval indicates the time required to transmit one byte in a shaping bandwidth. Further, the unit of the sending IP packet length is the number of bytes. Such a calculation allows the accommodation or absorption of fluctuations due to the difference between the numbers of bytes of sending packets.

When the shaper for ATM is utilized, the sending interval of each ATM cell may be calculated as given by the following equation as the reference.

Sending interval=(Sending interval of ATM cell based on contracted bandwidth)×(Sending IP packet length)/53 where the IP packet length is indicated by a byte unit.

Owing to the normalization executed in 53 bytes in this way, when an IP packet short in packet length is sent, the time elapsed between the transmission of the IP packet and the next packet transmission can be made short, whereas when an IP packet long in packet length is sent, the time elapsed between the transmission of the IP packet and the next packet transmission can be made long. Thus, the packet sending interval set according to the contracted band can be shortened regardless of the packet length, and the efficient transfer can be performed within the contracted band.

While the priority control is effected within the contracted band, based on the priorities of the IP packets in the aforementioned example, information such as a low delay demand (3rd bit), a high throughput demand (4th bit), high-reliability information (5th bit) of the TOS field, etc. may be used.

While the example has shown the embodiment for performing shaping in the two stages, the number of stages for shaping may be three or more. In the case of ATM, for example, the three-stage shaping can be used as a VP bandwidth (3rd stage) and a VC bandwidth (2nd stage) at the time that it is desired to provide a plurality of priority classes within VC, and a bandwidth (1st stage) in an in-VC priority class. Owing to such an execution of band control, the bandwidth lying within VC can be finely controlled when a user manages a plurality of high-order applications within the same VC.

Further, another example of the three-stage shaping can be used as a user bandwidth (3rd stage), a VP bandwidth (2nd stage) and a VC bandwidth (1st stage) at the time that a plurality of users desire to use a plurality of VP. Furthermore, fourth-stage shaping is used in, for example, a user bandwidth (4th stage), a VP bandwidth (3rd stage), a VC bandwidth (2nd stage), a bandwidth (1st stage) in an in-VC priority class, etc.

When n-stage shaping (where n: natural number) is performed in general, EST calculation units and sorting units are provided by n pairs and a process identical to the process described in the two-stage shaping may be performed. Namely, the respective EST calculation units and the sorting units calculate estimated sending times independently respectively and revise the estimated sending times according to an estimated sending time of a subordinate concept (VP: superordinate concept and VC: subordinate concept in the case of VP and VC) as needed, followed by sorting of the estimated sending times. A sending controller refers to sorting results of the sorting units with respect to the most superordinate concept in order and sends a cell from the corresponding VC only when all the sorting units are in a transmittable state.

According to the present invention, as has been described above, a traffic shaper can be provided wherein when a contract is made with the public ATM network in VP units, the contracted band for VP can be effectively utilized while the contracted band for the VP is being kept, and priority control can be effected between a plurality of VC within the same VP. It is also possible to provide a traffic shaper capable of effecting shaping on a plurality of output lines by one traffic shaper. Further, the present invention is not specialized on ATM and can perform even traffic shaping on each variable length packet.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A communication device comprising:
   a first estimated sending time calculation unit for calculating a first data estimated sending time, based on a bandwidth contracted for each connection;
   a second estimated sending time calculation unit for calculating a second data estimated sending time, based on a bandwidth contracted for each connection bundle obtained by collecting said connection in plural form;
   means for selecting either said first data estimated sending time or said second data estimated sending time to be used upon transmission of data;
   a first sorting unit for selecting a connection earliest in the first data estimated sending time calculated by said first estimated sending time calculation unit;
   a sending controller for sending a cell when the cell belonging to the connection selected by said first sorting unit may be sent;
   a second sorting unit for selecting a connection bundle earliest in the second estimated sending time calculated by said second estimated sending time calculation unit; and
   means for activating said sending controller when a cell belonging to the connection bundle selected by said second sorting unit.

2. A communication device according to claim 1, further comprising:
   means for setting priorities to connections lying within said each individual connection bundles, and wherein said first sorting unit selects a connection earliest in the first data estimated sending time from a group of connections each having the same priority and lying within the respective connection bundles, and said sending controller sends data which is in a transmission-allowed state and belongs to a connection given a high priority.

3. A traffic shaper, comprising:
   a cell buffer for temporarily storing each received cell therein;
   a first estimated sending time calculation unit for calculating a first estimated cell sending time at which a sending interval set according to a bandwidth contracted for each connection is kept;
   a first sorting unit for selecting a connection earliest in the first estimated cell sending time calculated by said first estimated sending time calculation unit;
   a sending controller for determining whether the transmission of a cell which belongs to the connection selected by said first sorting unit is allowed, reading out the corresponding cell from said cell buffer when the transmission of the cell is allowed, and sending the same therefrom;
   a second estimated sending time calculation unit for calculating a second estimated cell sending time at which a sending interval set according to a bandwidth contracted for each connection bundle obtained by collecting said connection in plural form is kept;
   a second sorting unit for selecting a connection bundle earliest in the second estimated cell sending time calculated by said second estimated sending time calculation unit; and
   means for determining whether a cell which belongs to each connection bundle selected by said second sorting unit, may be sent to said sending controller, when the transmission of the cell is allowed, determining whether the cell belonging to the connection selected by said first sorting unit may be sent, reading out the corresponding cell from said cell buffer when the transmission of the cell is allowed, and sending the cell therefrom.

4. A traffic shaper according to claim 3, further comprising:
   means for setting priorities to connections lying within said each individual connection bundles; and
   said first sorting unit is means for selecting a connection earliest in the first estimated cell sending time from a group of connections each having the same priority and lying within the respective connection bundles; and wherein
      said sending controller is provided with means for determining whether the cell belonging to each connection bundle selected by said second sorting unit may be sent, and when the transmission of the cell is allowed, sending a cell which is placed in a transmission-allowed state and belongs to a connection given the highest priority, from a connection selected for each priority by said first sorting unit.

5. A traffic shaper according to claim 3, further comprising:
   means for storing therein a decision bit indicative of whether a transmission-wait cell exists within said cell buffer, for each connection.

6. A traffic shaper according to claim 3, further comprising:
   means for storing therein a decision bit indicative of whether a transmission-wait cell exists within said cell buffer, for each connection bundle.

7. A traffic shaper according to claim 5, wherein said second estimated sending time calculation unit has a time revisor for using a first estimated cell sending time as a second estimated cell sending time when the first estimated cell sending time for each connection selected by said first sorting unit is in future ahead of the second estimated cell sending time calculated by said second estimated sending time calculation unit and the cell-presence decision bit for the connection selected by said first sorting unit is set.

8. A traffic shaper according to claim 5, wherein said second estimated sending time calculation unit is provided with a time revisor which uses a first estimated cell sending time as a second estimated cell sending time when the first estimated cell sending time for the connection earliest in the first estimated cell sending time among the connections selected every priorities by said first sorting unit and to which cell-presence decision bits provided for each connections are set, is in future ahead of the second estimated cell sending time calculated by said second estimated sending time calculation unit, and which is activated so as to avoid a change in the second estimated cell sending time when the cell-presence decision bits provided for each connections are not set to all the connections selected every priorities by said first sorting unit.

9. A traffic shaper according to claim 6, wherein said second estimated sending time calculation unit has means which, when the cell-presence decision bits provided for each connections are not set to all the connections selected every priorities in said given connection bundle by said first sorting unit, resets a cell-presence decision bit to said connection bundle, and which, when the cell-presence decision bit provided for each connection is not set to any of the connections selected every priorities in said given connection bundle by said first sorting unit, sets a cell-presence decision bit to said connection bundle.

10. A traffic shaper according to claim 3, wherein VC (Virtual Connection) is used as said each connection and VP (Virtual Path) is used as said each connection bundle.

11. A traffic shaper according to claim 3, wherein VC is used as said each connection and a line is used as said each connection bundle.

12. A packet communication device connected to a packet transfer network, comprising:
   a packet buffer for temporarily storing each received packet therein;
   a first estimated sending time calculation unit for calculating a first estimated packet sending time at which a sending interval set according to a bandwidth determined for each packet priority is kept;
   a first sorting unit for selecting a packet priority earliest in the first estimated packet sending time calculated by said first estimated sending time calculation unit;
   a second estimated sending time calculation unit for calculating a second estimated packet sending time at which a sending interval set according to a bandwidth contracted for each packet transfer destination is kept;
   a second sorting unit for selecting a packet transfer destination earliest in the second estimated packet sending time calculated by said second estimated sending time calculation unit; and
   a sending controller for determining whether a packet which belongs to each packet destination selected by said second sorting unit may be sent, when the transmission of the packet is allowed, determining whether the packet belonging to the packet priority selected by said first sorting unit may be sent, reading out the corresponding packet from said packet buffer when the transmission of the packet is allowed, and sending the packet therefrom.

13. A packet communication device according to claim 12, further comprising:
   means for extracting packet length information described in a header of a packet when the packet is read out from said packet buffer, and wherein
      said first estimated sending time calculation unit calculates a first estimated packet sending time by using a sending interval proportional to said packet length information, and said second estimated sending time calculation unit calculates a second estimated packet sending time by using the sending interval proportional to said packet length information.

14. A packet communication device according to claim 12, further comprising:
   means for storing therein a decision bit indicative of whether a transmission-wait packet exists within said packet buffer, for each packet priority.

15. A packet communication device according to claim 12, further comprising:
   means for storing therein a decision bit indicative of whether a transmission-wait packet exists within said packet buffer, for each packet transfer destination.

16. A packet communication device according to claim 14, further comprising:
   a time reviser for using, when a first estimated packet sending time corresponding to a packet priority selected by said first sorting unit is in future ahead of a second estimated packet sending time calculated by said second estimated sending time calculation unit and a packet-presence decision bit corresponding to the packet priority selected by said first sorting unit is set, the first estimated packet sending time as the second estimated packet sending time.

* * * * *